(12) United States Patent
Vaughan

(10) Patent No.: US 11,288,167 B2
(45) Date of Patent: Mar. 29, 2022

(54) SYSTEM AND METHOD FOR VISUALIZING AND MEASURING SOFTWARE ASSETS

(71) Applicant: HNL Partners, LLC, Jacksonville Beach, FL (US)

(72) Inventor: Jeremy J. Vaughan, Jacksonville Beach, FL (US)

(*) Notice: Subject to any disclaimer, the term of this patent is extended or adjusted under 35 U.S.C. 154(b) by 0 days.

(21) Appl. No.: 17/362,795

(22) Filed: Jun. 29, 2021

(65) Prior Publication Data

US 2021/0326239 A1 Oct. 21, 2021

Related U.S. Application Data

(63) Continuation-in-part of application No. 15/961,854, filed on Apr. 24, 2018, now Pat. No. 11,080,162.

(60) Provisional application No. 62/490,005, filed on Apr. 25, 2017.

(51) Int. Cl.
| | |
|---|---|
| *G06F 11/36* | (2006.01) |
| *G06F 8/77* | (2018.01) |
| *G06F 11/30* | (2006.01) |
| *G06F 11/34* | (2006.01) |

(52) U.S. Cl.
CPC ............ *G06F 11/3616* (2013.01); *G06F 8/77* (2013.01); *G06F 11/302* (2013.01); *G06F 11/3466* (2013.01); *G06F 2201/865* (2013.01)

(58) Field of Classification Search
CPC .............. G06F 11/3616; G06F 11/302; G06F 11/3466; G06F 8/77; G06F 2210/865
See application file for complete search history.

(56) References Cited

U.S. PATENT DOCUMENTS

| | | | |
|---|---|---|---|
| 9,515,999 B2 | 12/2016 | Ylonen | |
| 10,158,654 B2* | 12/2018 | Hamdi | ................. G06F 21/577 |
| 11,080,162 B2* | 8/2021 | Vaughan | ............. G06F 11/3616 |
| 2015/0222604 A1* | 8/2015 | Ylonen | ................... H04L 9/083 |
| | | | 713/171 |

* cited by examiner

*Primary Examiner* — Bryan Bui
(74) *Attorney, Agent, or Firm* — Wilson Dutra, PLLC; Camille A. Wilson

(57) ABSTRACT

The present disclosure provides generally for a system and method for visualizing and measuring software assets and identifying security risk and vulnerabilities associated with products and personnel. An analytics engine may be configured to analyze a software asset and provide a plurality of analytics and a plurality of insights related to the software asset. A correlation engine may be configured to translate the plurality of insights into a set of universal data and correlate the plurality of insights to predefined risks associated with the software asset.

18 Claims, 25 Drawing Sheets

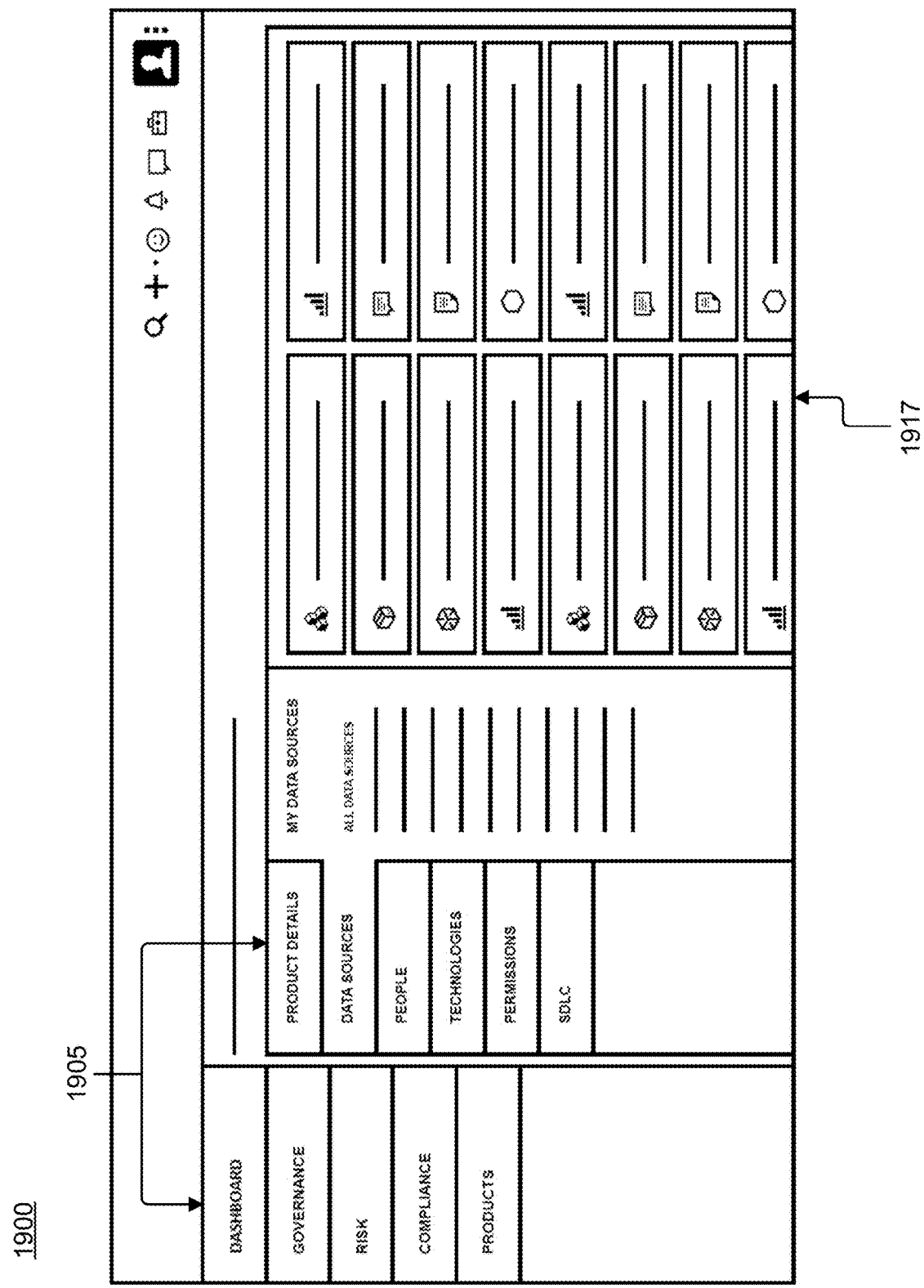

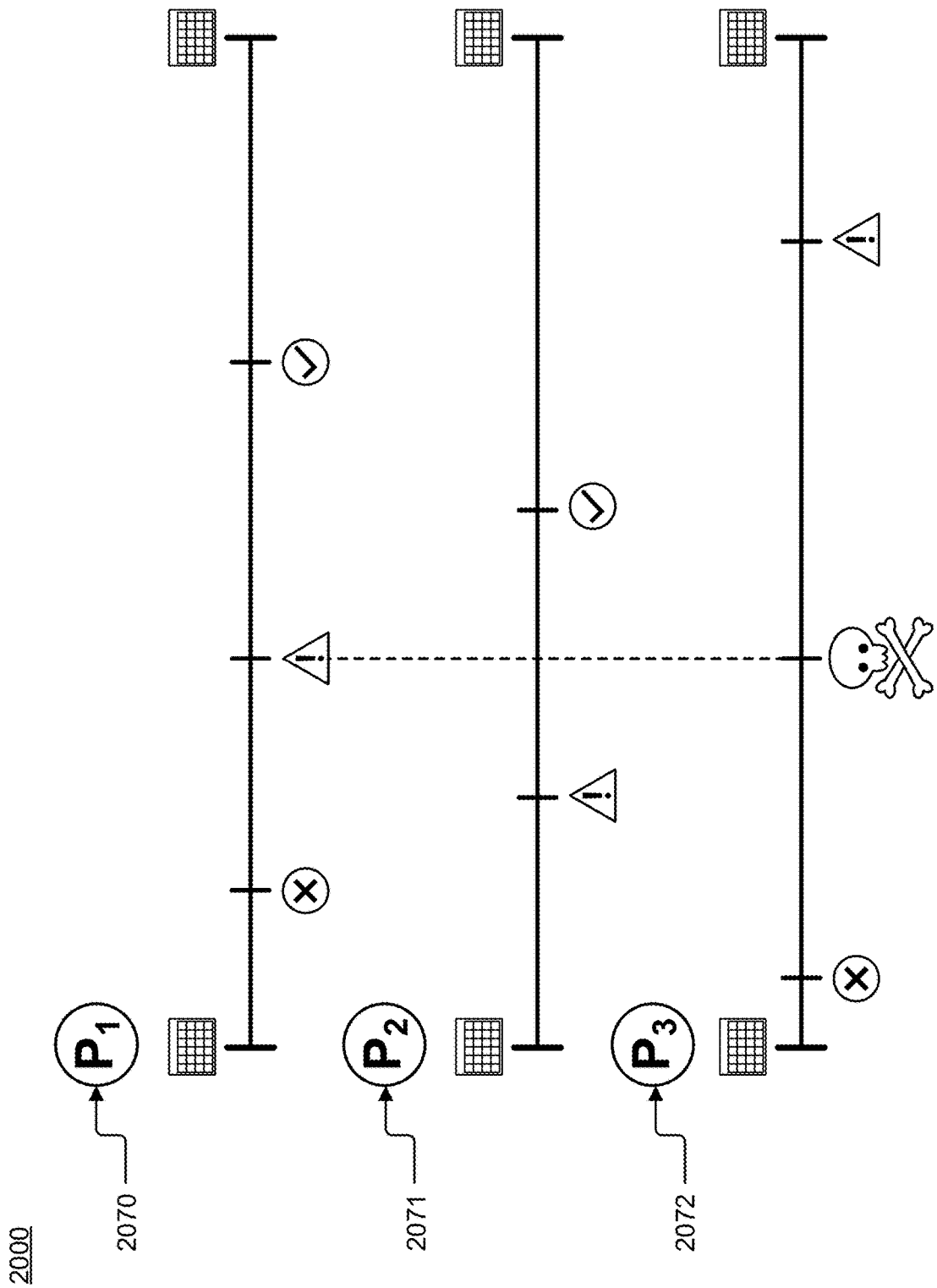

SYSTEM AND METHOD FOR VISUALIZING AND MEASURING SOFTWARE ASSETS

CROSS-REFERENCE TO RELATED APPLICATION

This application is a continuation in part of currently pending U.S. Nonprovisional patent application Ser. No. 15/961,854, filed Apr. 24, 2018, and titled "SYSTEM AND METHOD FOR VISUALIZING AND MEASURING SOFTWARE ASSETS", which claimed priority to and the full benefit of U.S. Provisional Patent Application Ser. No. 62/490,005, filed Apr. 25, 2017, and titled "SYSTEM AND METHOD FOR VISUALIZING AND MEASURING SOFTWARE ASSETS", the entire contents of which are incorporated in this application by reference.

BACKGROUND OF THE DISCLOSURE

Software is used to facilitate and simplify a variety of tasks unique to each industry with the hope of keeping the daily, weekly, monthly, quarterly, and yearly goals and tasks of a business manageable. This is particularly important where there may be thousands of employees to keep track of, innumerable daily tasks to complete, and shifting goals within any given hour. Because of all the moving parts involved in managing a business, companies usually use more than one software program to stay apprised of their tasks and goals. Some even develop custom software to achieve their goals. Each individual program may be tuned to solve a different particular need and provide a different solution. A company or organization may use programs interchangeably, or use different ones to solve the same need in a different way. As a company grows or changes, so too does its software needs. If software they are using do not meet these needs, the search for software that serves their aims begins again, while other software remains untouched, unused, or underused within the organization.

Organizations and companies may also have systems and solutions built without explicit organizational approval or software not installed by the information technology (IT) department. Typically, shadow IT solutions do not align with an organization's requirements for control, documentation, security, and reliability, creating compliance issues down the line. Shadow IT can also add hidden costs to organizations, create inconsistencies within programs and projects due to the lack of uniformity between programs, produce security vulnerabilities, and cause inefficiencies within a company. Enterprise IT expenditures continually move outside the direct control of IT departments This results in a growing list of software to monitor, update, and maintain. If a company continues to experiment with applications or programs to help them on a daily basis, it is only natural that some will fall by the wayside. As a result of these concerns, information technology asset management (ITAM) serves to help businesses make strategic decision making within the IT environment, focusing on supporting life cycle management for software and hardware. One of the goals of ITAM is to help organizations manage their systems more effectively while saving time and money to avoid unnecessary future purchases. ITAM has the potential to stop projects from progressing that have inaccurate or old information.

Another aspect of ITAM is application lifecycle management (ALM) of computer programs, which helps a business manage and optimize the purchase, installation, implementation, maintenance, utilization, and removal of software applications within an organization. ALM focuses on effective management practices by controlling and protecting software to limit risk and exposure while increasing IT responsiveness and end-user productivity. For example, ALM may track license expirations for companies so companies operate within software compliance regulations. However, the role of a ALM program within an organization can vary widely based on a variety of factors, such as portfolio size, existing infrastructure, and available resources. Many ALM programs focus on reallocating underutilized software licenses within the company, enforcing compliance with terms and conditions, automating IT processes, and improving worker productivity.

Further, ALM often occurs in isolation for each individual product or software. This means that identified security risks for each product are considered separately without a larger understanding of vulnerabilities within an organization. A larger understanding of vulnerabilities may allow for more proactive actions to prevent or cure security risks within the organization.

SUMMARY OF THE DISCLOSURE

What is needed is a user-friendly, intuitive visualization system that provides a method for real-time insight to users within an organization, with real-time analytics and insights related to software assets within the organizations. These users may collaborate with others across the organization within the system to implement changes, brainstorm further ideas on managing software or projects, track progress, and rapidly affect change in the organization within their permission levels. As an organization accrues software, the software itself may be ranked, evaluated, or graded based on security risk, usability, reliability, benchmarks, and other factors. Upon installation, the system may integrate with whatever other software is in the system through an application programming interface (API) or hardware installed on-site to provide a fuller picture of what software a company has and how the software is being used.

These insights and functionality may be available within one central location, such as a dashboard interface, that may be accessed by anyone within an organization. Depending on the user's position within a team or within an organization, they may have access to multiple sources of information for a team. For example, a user may have access to budgeting or forecasting tools, product management tools, or operation tools. A user may create reports on each aspect that they would like to drill into, with the program able to identify risks the user should be aware of while providing actionable items that a user may set into motion immediately, by the system's recommendation, or at a time to be implemented by the system. These reports may also provide information on schedules, projects, internal team, or external vendor productivity, what software has had issues, and event tracking.

The present disclosure relates to a system for visualizing and measuring software assets. The system includes an analytics engine configured to analyze at least a first software asset and provide a first plurality of analytics and a first plurality of insights related to at least the first software asset; and a correlation engine configured to: translate the first plurality of insights into a first set of universal data, and correlate the plurality of insights to predefined risks associated with at least the first software asset.

In some embodiments, the first plurality of analytics may contribute to an analytics history. In some implementations, the analytics engine may be configured to aggregate the first plurality of analytics from the analytics history to develop risk maturity. In some aspects, the correlation engine may be further configured to provide cross-tool data insights. In some embodiments, the first plurality of insights may be configured to provide information about high risk scenarios. In some implementations, the correlation engine may be configured to provide a second plurality of analytics based on the predefined risks. In some aspects, the correlation engine may be configured to provide a second plurality of insights based on the second plurality of analytics. In some embodiments, the second plurality of insights may be configured to provide information about high-risk combinations. In some implementations, the correlation engine may be configured to categorize the set of universal data according to at least a first product. In some aspects, the analytics engine may be configured to operate recursively. In some embodiments, the first plurality of insights may be configured to provide a plurality of actionable items for measured implementation. In some implementations, the plurality of actionable items are stored in an analytics history. Implementations of the described techniques may comprise hardware, a method or process, or computer software on a computer-accessible medium.

The present disclosure relates to a method for visualizing and measuring software assets. In some embodiments, the method includes analyzing through an analytics engine a first software asset; providing a first plurality of analytics and a first plurality of insights related to the first software asset. In some implementations, the method includes translating through a correlation engine the first plurality of insights into a first set of universal data, and correlating the first plurality of insights to predefined risks associated with the first software asset.

In some aspects, the first plurality of analytics may contribute to an analytics history. In some embodiments, the analytics engine may be configured to aggregate the first plurality of analytics from the analytics history to develop risk maturity. In some implementations, the method may comprise analyzing through the analytics engine a second software asset; providing a second plurality of analytics and a second plurality of insights related to the second software asset; translating through the correlation engine the second plurality of insights into a second set of universal data; and correlating the second plurality of insights to predefined risks associated with the second software asset.

In some embodiments, the method may comprise correlating the first set of universal data and the second set of universal data. In some implementations, identifying may be based at least in part on correlating the first set of universal data and the second set of universal data. In some aspects, the method may comprise developing cross-tool data insights based at least in part on correlating the first set of universal data and the second set of universal data. In some embodiments, the method may comprise receiving a second plurality of analytics and a second plurality of insights related to a second software asset; translating through the correlation engine the second plurality of insights into a second set of universal data; and correlating the second plurality of insights to predefined risks associated with the second software asset.

BRIEF DESCRIPTION OF THE DRAWINGS

The accompanying drawings that are incorporated in and constitute a part of this specification illustrate several embodiments of the disclosure and, together with the description, serve to explain the principles of the disclosure:

FIG. 19C illustrates an exemplary graphical user interface.

FIG. 20 illustrates an exemplary software business management system.

DETAILED DESCRIPTION

Figure 1:
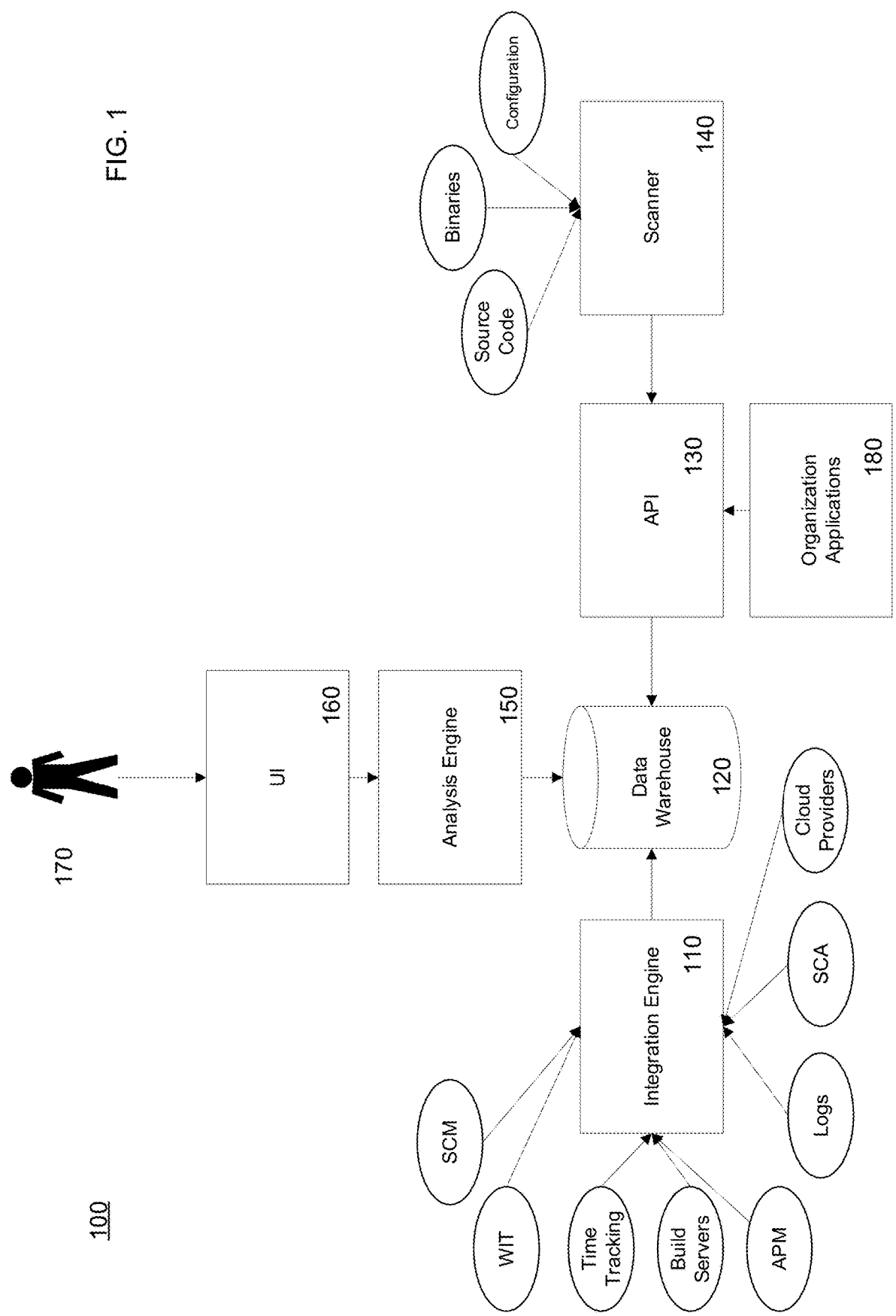
FIG. 1 illustrates a functional block diagram of an exemplary software business management system

The present disclosure provides generally for a system and method for visualizing and measuring software assets. According to the present disclosure, the system interacts through an API to discover and populate all software applications within an organization in an interface that provides the user real-time information regarding the software applications. The user is provided with a variety of options for navigating and acting on these applications, described below.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Insight: as used herein refers to data obtained or derived that, once analyzed, allows a software business management system to provide actionable information about the software being analyzed. Insights may include cost, quality, risk and security vulnerabilities that may be associated with a particular application, type of platform, or user group, as non-limiting examples.

Inventory Discovery: as used herein refers to a discovery tool that may be integrated into a system, wherein the discovery tool may identify, locate, and monitor stored files and data. Inventory discovery may allow an organization to have visibility of data throughout applications and users.

Software Discovery: as used herein refers to a discovery tool that may integrated into a system, wherein the discovery tool may identify, locate, and monitor software that may interface with the system. In some aspects, the discovery tool may identify one or both software stored within the system or software that interfaces with the systems.

Software Decay: as used herein refers to decreasing effectiveness of software over time. In some aspects, software decay may significantly impact the usefulness of the software, which may create susceptibility and inefficiencies in a business. Identifying and isolating software decay may allow a business to directly address the software decay, such as by excising, replacing, or updating the software.

Software Governance: as used herein refers to a business concept specific to the rules, procedures, and requirements for how a company or organization may use software within their business model. In some organizations, employees and contractors at a variety of levels may have the capability to install or edit software on business systems. Software governance may allow an organization to control and monitor software installed in the system. Software governance may allow an organization to maintain compliance with industry regulations, such as the Payment Card Industry Data Security Standard (PCI) or Health Insurance Portability and Accountability Act (HIPAA) compliance.

Software Business Management: as used herein refers to a business management system based on software applications utilized by the business, wherein software analytics may be used to develop business strategy related to the implementation of software within the business. In some aspects, software governance may comprise a rule set, and software business management may comprise the strategy.

Score: as used herein refers to a derived metric that may represent the relative value score of a software application. In some aspects, inputs to calculating the score may be normalized data values from a data warehouse. In some embodiments, the output of the score calculation may be a point-in-time numerical value that may be useful to compare applications to one another. In some implementations, the score may factor in metrics such as the size, quality, risk, activity, and performance of the application.

Product Economics: as used herein refers to the process of determining the economics of a product in its current state while considering cost and net benefit. In some aspects, product economics may allow software business management system to define the cost necessary to maintain current net benefit, allowing for a determination as to whether the economics of the current product may be improved by either increasing net benefit or reducing cost necessary to achieve better economics.

Economic Modeling: as used herein refers to an activity focused on understanding product economics in specific scenarios. For example, a company may be considering spinning out an internal application into its own product/company. Used internally, the product may have a different economic model than if spun out of the organization.

Threat Intelligence: as used herein refers to the potential security vulnerabilities that may be found in either the software or the dependencies, tools, frameworks or languages used to create the software.

Software Development Life Cycle (SDLC): as used herein refers to a dashboard of information allowing technology leaders to see how well their entire software development organization may be performing.

Universal Data: as used herein refers to data translated to allow for standard comparison between multiple products or software assets.

Referring now to FIG. 1, a functional block diagram of an exemplary software business management system 100 is illustrated. In some embodiments, a software business management system 100 may comprise an analytics tool designed to provide insight specific for organizations dependent on software within their organization. In some aspects, insight may allow companies to benefit from the use of custom software from valuation to benchmarking. In some implementations, metrics may guide organizations to achieving a higher value business through better decision making around their customer software assets.

In some aspects, software business management may rely on data, which may comprise a variety of forms from a range of sources, including, for example, external APIs 180, external databases, system API 130, and user-provided data.

Some examples of external API 180 sources may include source control management (SCM), work item tracking (WIT), time tracking, build servers, application performance monitoring (APM) tools, error logs, static code analysis (SCA) tools, cloud providers, and any other data sources surrounding software development and management that have APIs available. In some aspects, authentication may be used to connect to these external APIs 180 to limit storage of sensitive credentials. For example, authentication mechanisms may include shared access signatures (SAS), personal access tokens, API keys, as non-limiting examples.

External databases may include vulnerability databases, dependency repositories, product version data, open source code repositories, and other similar sources of data about software versions and vulnerabilities that are externally maintained.

In some aspects, a system API 130 may serve three primary functions: to allow customers to push data into the software business management system 100 via organization applications, to enable a software business management system scanner 140 to push data into the software business management system 100 from behind an organization's firewall, and to allow customers to pull data out of the software business management system 100 for reporting purposes. In some embodiments, the software business management system scanner 140 may comprise an application that may run at build time on an organization's build server to analyze their source code, binaries, and configuration to glean useful information, such as framework versions, 5 dependencies, database discovery, as non-limiting examples. In some aspects, the software business management system scanner 140 may take this information and push it into the software business management system 100 via the software business management system API 130. In some embodiments, plug-ins may be used for various build servers to facilitate the adoption of the software business management system scanner 140.

In some aspects, the software business management system scanner 140 may be installed on organization build servers. The software business management system scanner 140 may apply standard and proprietary algorithms to organization source code, which may be used to generate data for an analysis engine 150. The software business management system scanner 140 may be useful where an organization may not permit their source code to leave the organization environments. In some aspects, the software business management system scanner 140 may exist within the organization environments and constantly analyze the source code. From there, the software business management system scanner 140 may push the generated or computed data, in contrast to source data, up to a data warehouse 120, which may utilize secure connections.

In some aspects, the software business management system may receive user-provided data, which may include manually entered data that a user 170 may input via a software business management system UI 160. For example, user-provided data may comprise a cost worksheet with costs needed to develop and run an application, collaboration discussions, key events, and portfolio assignments.

In some embodiments, receipt of data may initiate analysis. In some aspects, additional data access may expand the analytic capabilities of the software business management system 100. In some implementations, the data may be converted or translated via the software business management system integration engine 110 into a common, unified format in the software business management system data warehouse 120. An integration engine 110 may allow for universal treatment of different data providers despite them having different forms of APIs 130.

Once the data is in a unified format in a software business management system data warehouse 120, the software business management system analysis engine 150 may apply mathematical and statistical algorithms to the data to extract meaningful information. The algorithms may span from simple summations over a time series to machine learning (ML) algorithms such as Naïve Bayes classifiers and least squares linear regression, as non-limiting examples. In some embodiments, the analysis engine 150 may be programmed to detect outliers in data that may represent a mere departure from the norm or a severe cause for concern.

In some aspects, the detections may be transformed into insights that may be presented to the user 170 as alerts. Users 170 may also receive email notifications of insights as they are discovered. The output of this analysis may be made available to the software business management system UI 160 for use in charts and other visualizations.

Figure 2:
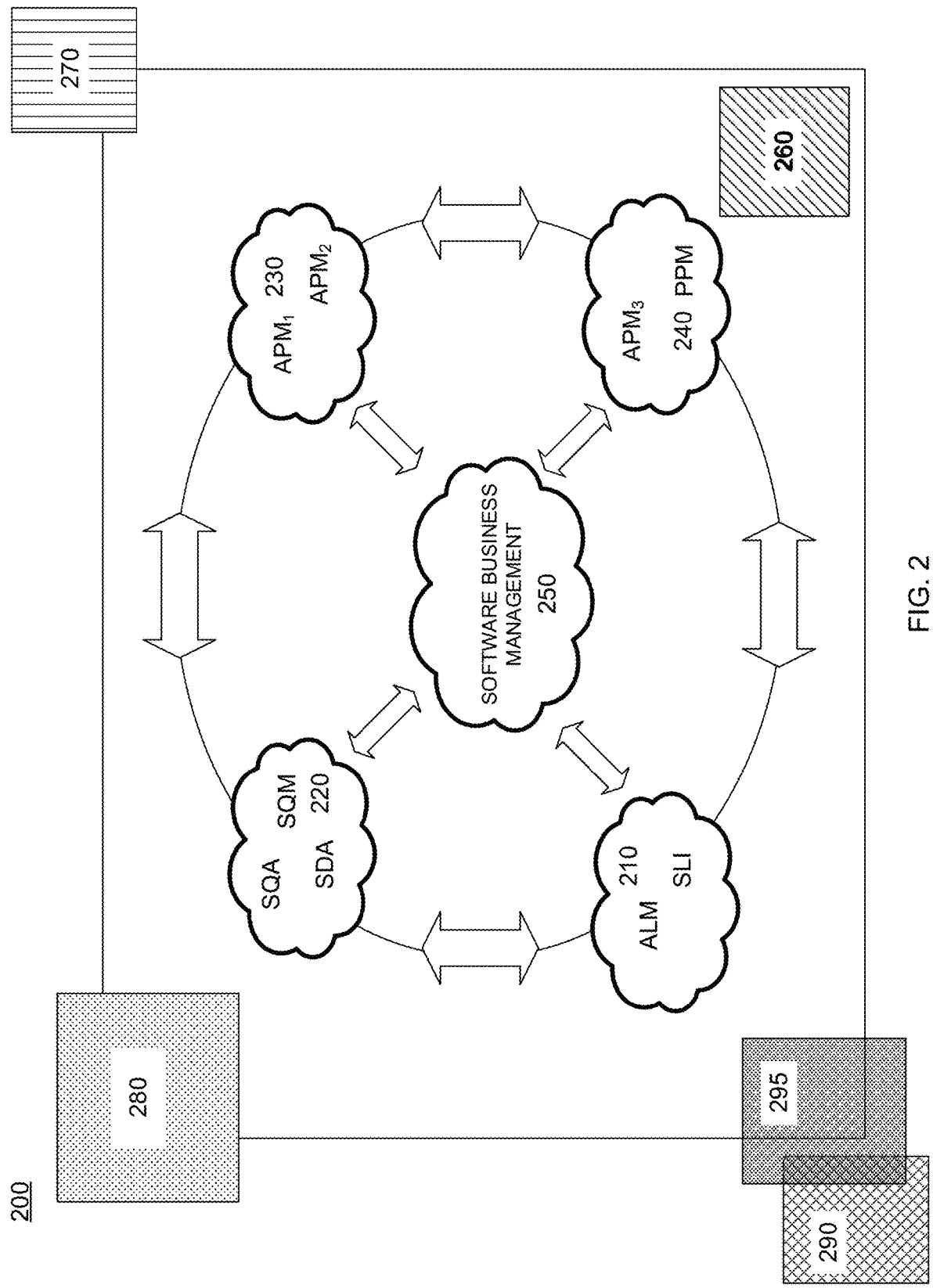
FIG. 2 illustrates an exemplary software business management system infrastructure.

Referring now to FIG. 2, an exemplary software business management system infrastructure 200 is illustrated. In some aspects, organization software 260, 270, 280, 290, 295 may be analyzed by a series of analytic and management mechanisms 210, 220, 230, 240. In some aspects, at 210, application lifecycle management and software integration analysis and management may occur. At 220, software quality analytics, software quality measurement, and software development analytics and management may occur. At 230, application performance management and application performance monitoring may occur. At 240, application portfolio management and project portfolio management may occur.

In some embodiments, a software business management system 250 may access and monitor fully-contained software 260, wherein the system API may store and control the fully-contained software 260. In some aspects, the software business management system 250 may access partially-controlled software 270, 280, wherein a portion of the partially-controlled software 270, 280 may be located within the software business management system. In some implementations, the software business management system 250 may access linked software 290, 295, which may interface through a partially-controlled software, fully-contained software, through an authorization mechanism, or combinations thereof. In some embodiments the software business management system 250 may monitor software for inefficiencies.

In some aspects, the software business management system 250 may expedite access to more complete information as it relates to the technology in question. In some embodiments, the software business management system 250 may use static code analysis to perform code analysis. In some implementations, the software business management system 250 may integrate with existing tools used within an organization. In some aspects, once integrated, the software business management system 250 may develop economic models for products within the organization. In some embodiments, the software business management system 250 may provide a value-at-risk for each product within the economic models developed for each product.

For example, a buy-side organization in a merger and acquisition may collaborate with a sell-side organization by using the software business management system 250. The software business management system 250 may allow these sides access to see information gathered in a due diligence phase, track the diligence process, and discover where teams have remediation plans to improve code. The software business management system 250 may measure economic models over time to provide greater insight for the negotiations. This may allow for more successful merger and integration phases.

As another example, an incoming chief officer of a company typically has due diligence and transparency obligations coupled with objective data and collaboration needs. The software business management system 250 may provide onboarding and insight to the incoming officer regarding the software portfolio's current state and value without the learning curve associated with a chief officer's first 100 days. In some implementations, this may come in the form of the software business management system 250 identifying the strategic opportunities, portfolio strengths and weaknesses, and where to invest for the chief officer.

Figure 3:
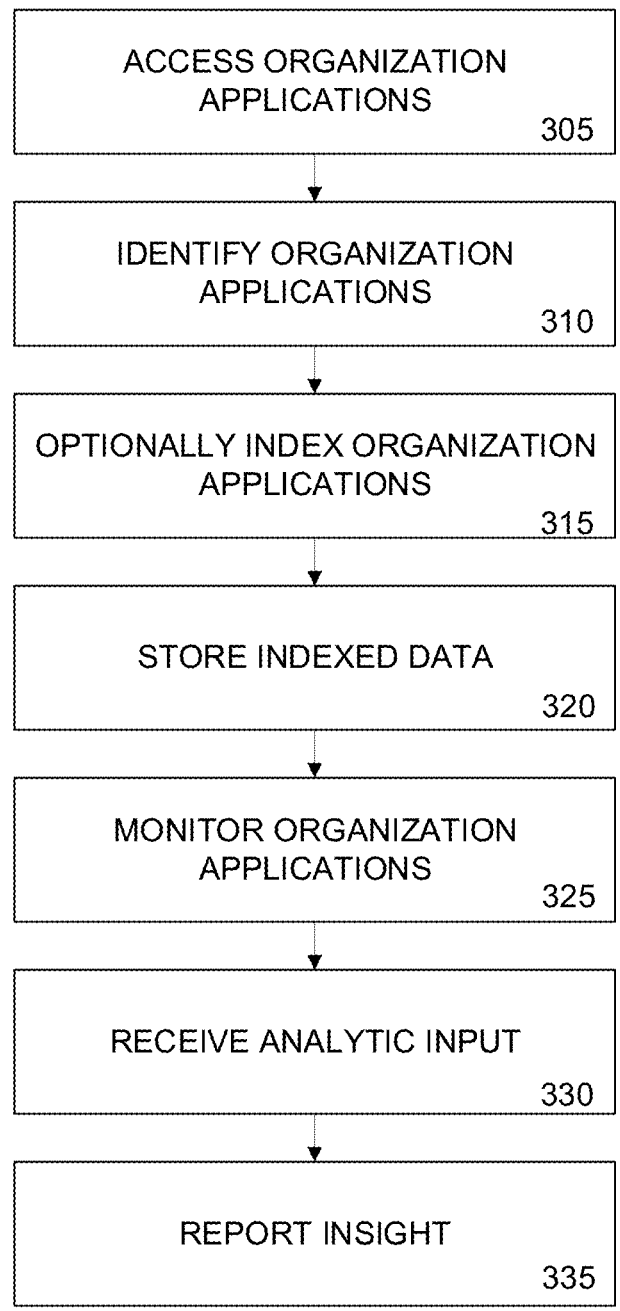
FIG. 3 illustrates exemplary method steps for software business management.

Referring now to FIG. 3, exemplary method steps for software business management are illustrated. At 305, organization applications may be accessed. In some aspects, an authorization mechanism may be required. At 310, organization applications may be identified, such as through software discovery. At 315, organization applications may be normalized. In some implementations scoring may allow for universal comparison between different platforms, application types, and application brands. At 320, normalized data may be stored, and at 325, organization applications may be monitored. At 330, an analytic input may be received, and at 335, insight may be reported.

In some aspects, inventory discovery may identify and locate files associated with or stored through organization applications. In some embodiments, at 325, the monitoring may detect software decay, which may identify applications that may be losing effectiveness. Loss of effectiveness may be caused by one or more factors, such as outdated software, outgrowing the limitations of the software, changing platforms, new software with overlapping functionality, a decrease in the need for or use of the software, frequent crashes, error logs, or incompatibility, as non-limiting examples.

Figure 4:
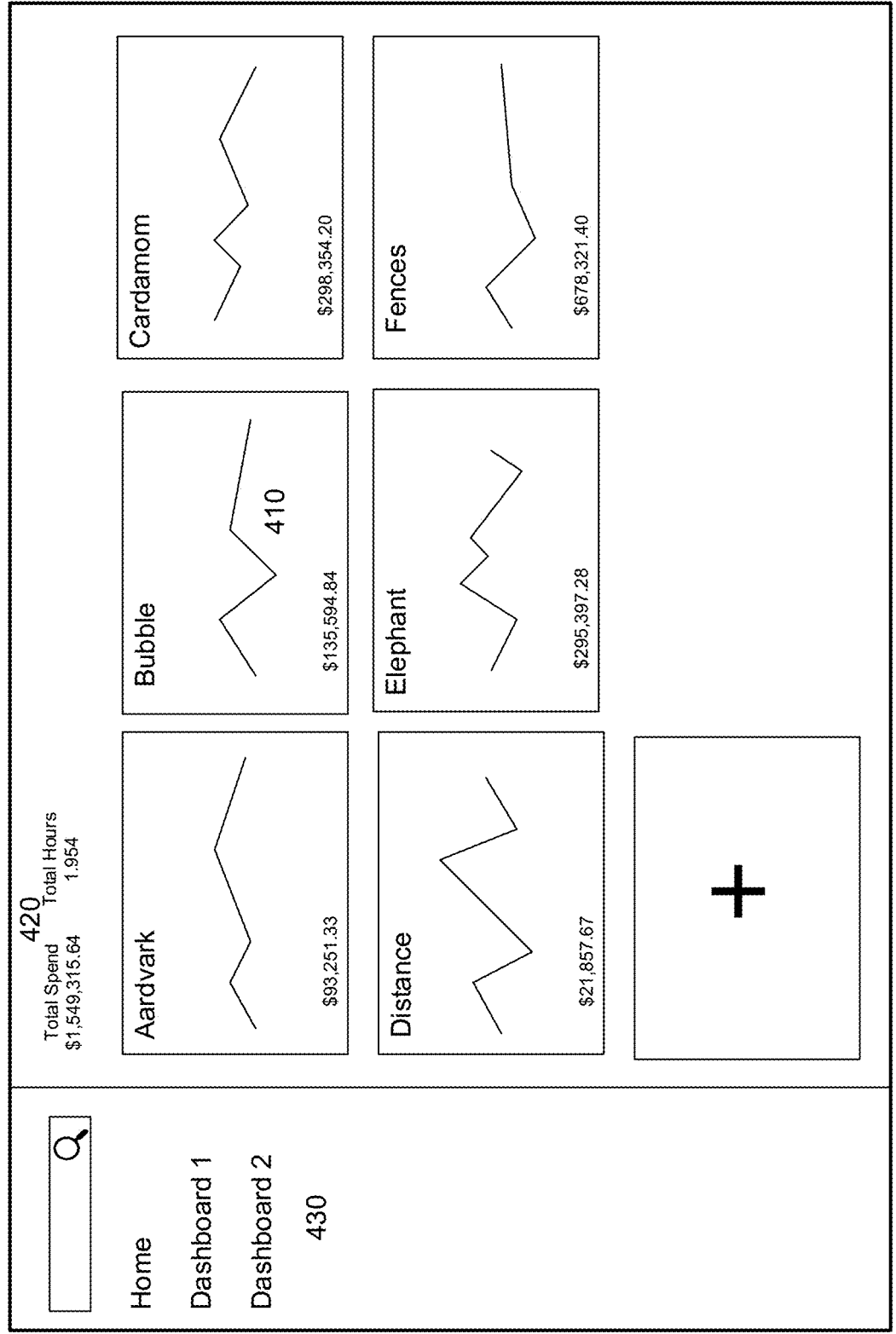
FIG. 4 illustrates exemplary software business management graphical user interface (GUI).

Referring now to FIG. 4, an exemplary software business management graphical user interface (GUI) 400 is illustrated. In some aspects, a software business management GUI 400 may present general monitoring visualizations 410 for one or more of the organization applications and snapshot analytics 420 that may present information that a user or organization may consider a priority. The software business management GUI 400 may comprise a user menu 430, which may allow a user to navigate the software business management system.

In some aspects, vulnerabilities may be delivered via a software business management GUI 400. In some embodiments, the software business management GUI 400 may communicate the total number of vulnerabilities in the entire software portfolio and allow organizations to search for specific vulnerabilities. In some implementations, the system may allow users to delegate the work of addressing vulnerabilities to track and ensure the vulnerabilities are being addressed. In some aspects, the system may display a remediation panel, which may communicate the average time taken to resolve vulnerabilities found.

In some embodiments, a software business management GUI 400 may illustrate information related to software development lifecycle (SDLC). In some aspects, in places where the organization may not be performing well, the system may use alerts and icons to make clear that something is not performing as expected or within acceptable parameters. In some embodiments, this may allow technology leaders to focus their time on the areas of the software develop organization that most need attention first.

Figure 5:
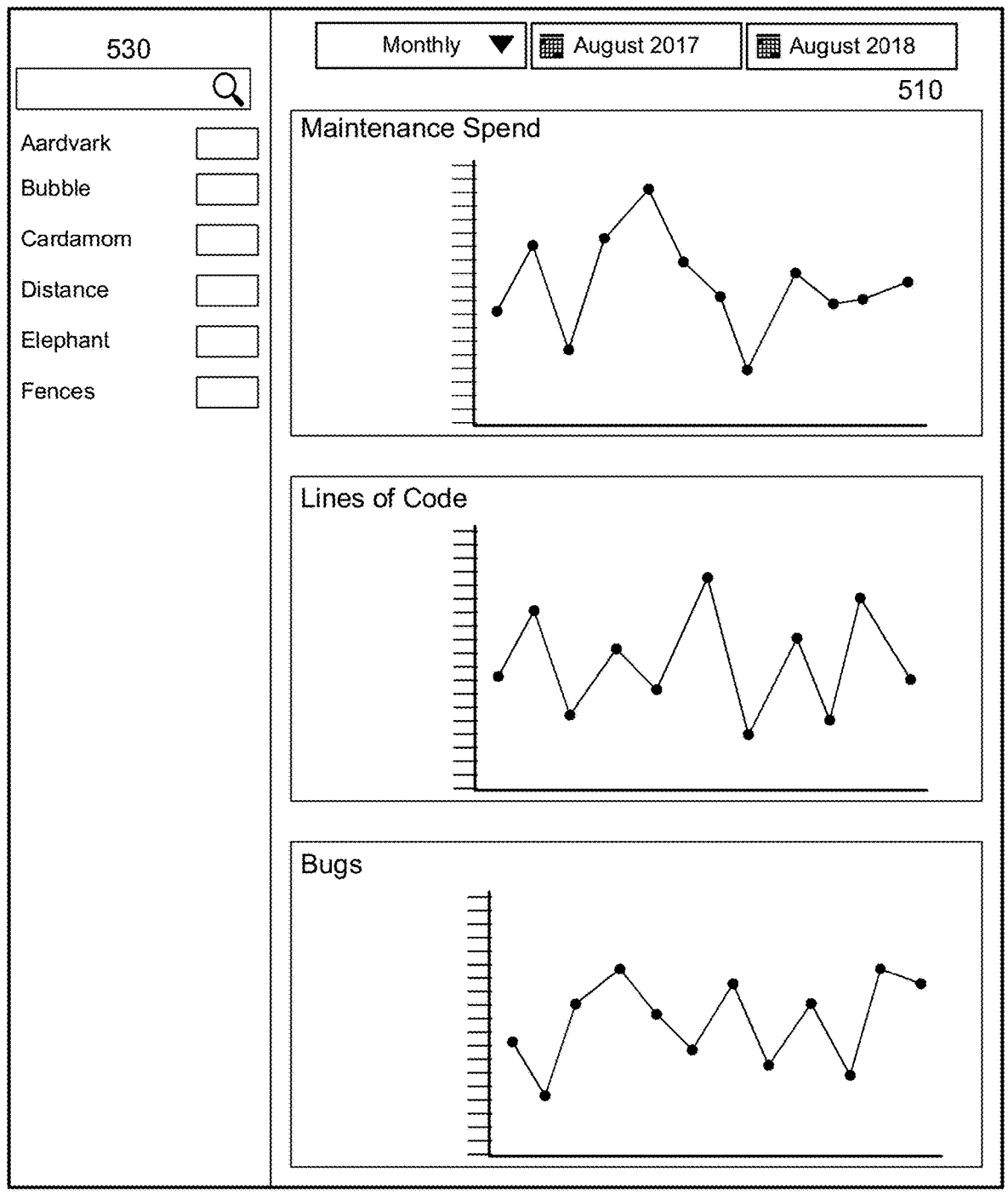
FIG. 5 illustrates exemplary software business management graphical user interface (GUI).

Referring now to FIG. 5, an exemplary software business management graphical user interface (GUI) 500 is illustrated. In some aspects, a software business management GUI 500 may present detailed monitoring visualizations 510 for one or more of the organization applications and filter or view options 520 that may allow a user or organization to customize the visualization. The software business management GUI 500 may comprise a secondary visualization 530, which may allow a user to view limited details for a large selection of organization applications.

Companies that have custom software may require an ever-growing list of tools to be successful and efficient. The landscape of tools may constantly grow and change, as the field progresses. In some embodiments, the software business management system may adapt, evolve, and grow with the industry.

In some aspects, the software business management system may utilize a two-stage data warehouse, wherein data from the external data sources may be pulled into the first stage of the data warehouse. This may both capture the data in its native form and ensure that if the tool goes down, or goes away, the data that was previously generated by that tool, software, or platform may still be accessible, which may be critical to long term analytics, through updates or firmware, or by predictive or prescriptive functionality.

In some embodiments, through machine learning, the software business management system may create more efficient software structure on its own or by approval from a user. In some implementations, a software business management system may write code to implement on its own based on prior builds. For example, custom software implemented within an organization may cause more system crashes than prior builds did. A software business management system, using former code, may create lines of code to solve the crashing issue based on a more stable build, or by discovering and writing code for what may be a more stable build. In some aspects, a software business management system may generate lines of code for a software engineer who may guide a software business management system in implementation or on what problems to solve. In some embodiments, a software business management system may detect software decay and develop code to ensure the continued viability of the affected software.

Generally, over time, companies and organizations may lose historical data when the organization changes tools. For example, if a company has been using one product for project management, but changed over to a second product for similar functionality, companies may lose the historical data from the original product, making it difficult to measure the whole history of the projects and difficult to compare the effectiveness of the two products. In some aspects, the software business management system may capture the core data components in the first stage of the warehouse, making it easy for clients to change tools without losing their history.

Customarily, software tools use their own language and terminology and organization may differ between tools. In some embodiments, the software business management system may create a translation of the languages and terminology, wherein the translation may allow for a one-to-one comparison of effectiveness and efficiency between software. In some aspects, the software business management system may establish baseline standards of technical cost, quality, risks, and vulnerabilities of a software portfolio. In some embodiments, the baseline may be based on the custom needs and efficiency goals of a particular organization. In some aspects, a general baseline may initially establish baselines across an industry, platform type, or specific applications, as non-limiting examples. A general baseline may evolve over time, adapting to input goals or machine learning from organizational changes.

In some embodiments, artificial intelligence and machine learning may be utilized to dynamically present analytic reporting and insights to a user. In some embodiments, correlations in the data across platforms may allow users to review analytics without requiring separate access to each application in the software portfolio.

In some aspects, general external data sources may be pulled into the data warehouse, wherein the two-stage warehouse system may limit vulnerability to security breaches and loss of historical data. In some embodiments, security mechanisms may be integrated into the software business management system, such as limiting storage of user credentials to external services in the database and instead create authentication tokens or encrypt API keys, personal access tokens, or passwords in the database, such as through AES encryption. In some implementations, traffic from the software business management system may be transmitted via API over HTTPS, ensuring that communication is encrypted.

For example, the software business management system login information may utilize secure PBKDF2 hashing of salted passwords so that, in the event one or both database is compromised, the password may not leak. The database may be transparently encrypted at rest and in transit, as well as the storage account. In some aspects, onsite appliance versions of the software business management system may add another level of security.

Figure 6:
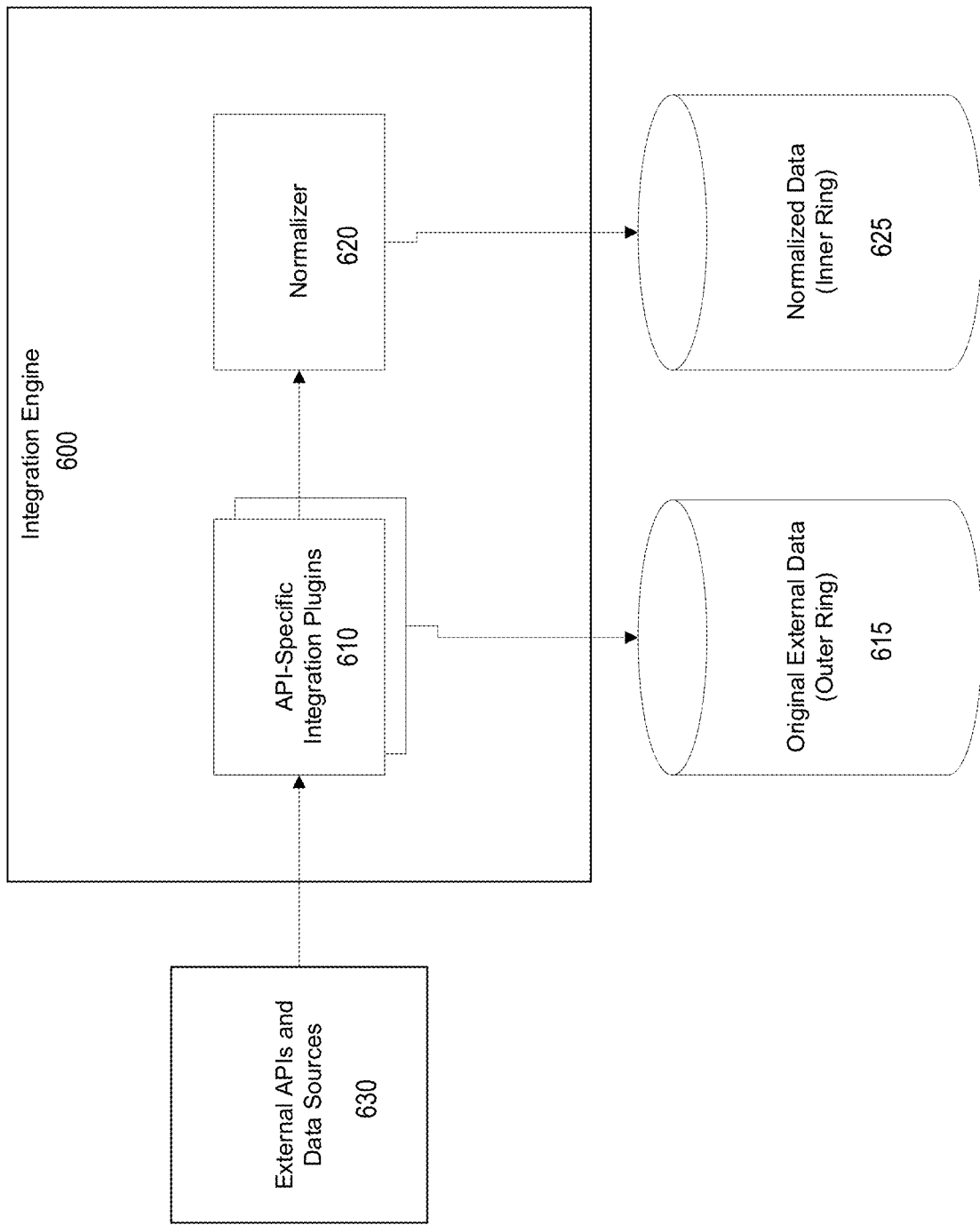
FIG. 6 illustrates apparatus that may be used to implement aspects of the present disclosure including executable software.

Referring now to FIG. 6, an exemplary integration engine 600 for use in a software business management system is illustrated. In some aspects, an integration engine 600 may comprise API-specific integration plug-ins 610, which may be specific to a vendor or platform type. In some embodiments, the integration engine 600 may receive external APIs and data sources 630 from an external source and the integration engine 600 may comprise a normalizer mechanism 620 that may allow for a uniform comparison of analytics and insights over different platforms. In some aspects, the API-specific integration plugins 610 may receive and process original external data 615 from an external database, such as an organization database or a vendor database. In some implementations, normalized data 625 may be stored in an inner ring database, wherein the content of the original external data 615 may not be stored limiting security vulnerability.

Figure 7:
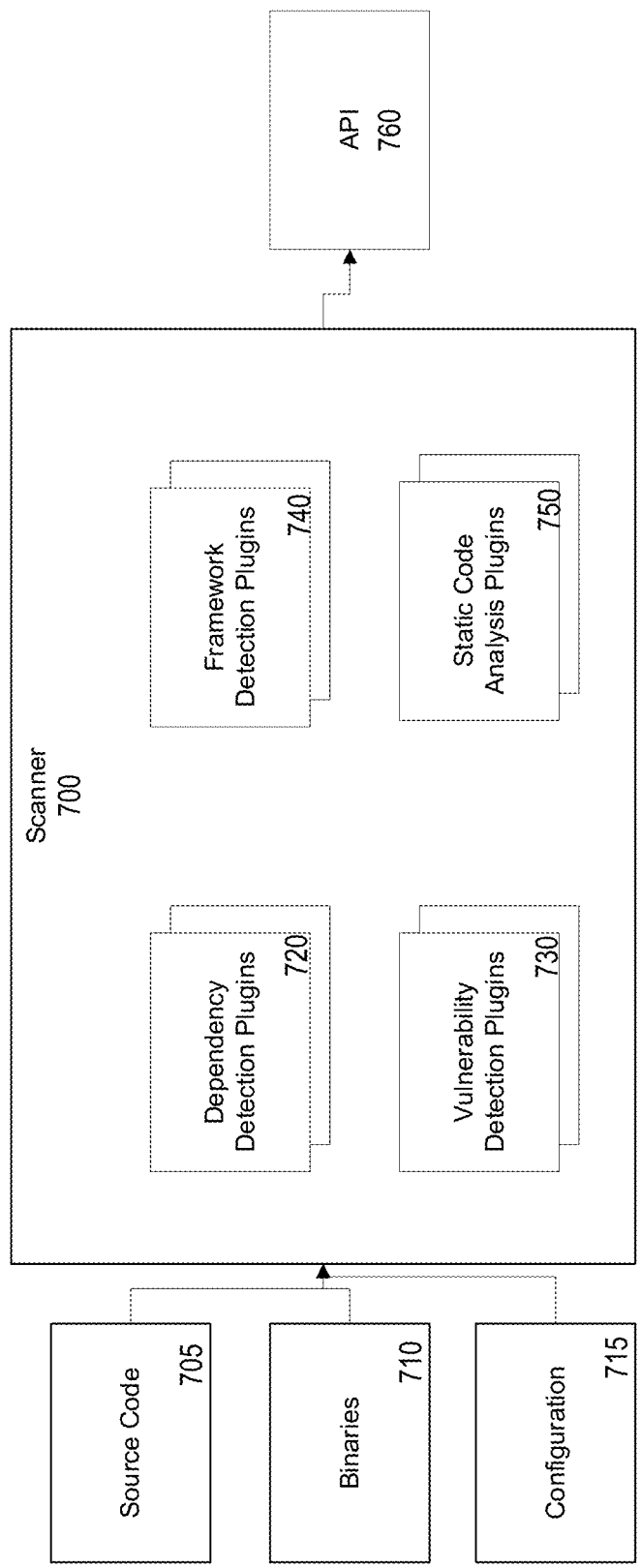
FIG. 7 illustrates an exemplary scanner for use in a software business management system.

Referring now to FIG. 7, an exemplary scanner 700 for use in a software business management system is illustrated. In some embodiments, a scanner 700 may receive source code 705, binaries 710, and configuration 715 from an external source, such as organization applications. In some aspects, the scanner 700 may comprise dependency detection plugins 720, vulnerability detection plugins 730, framework detection plugins 740, and static code analysis plugins 750, as non-limiting examples. In some implementations, the scanner 700 may transmit data to an API 760 of the software business management system.

Figure 8:
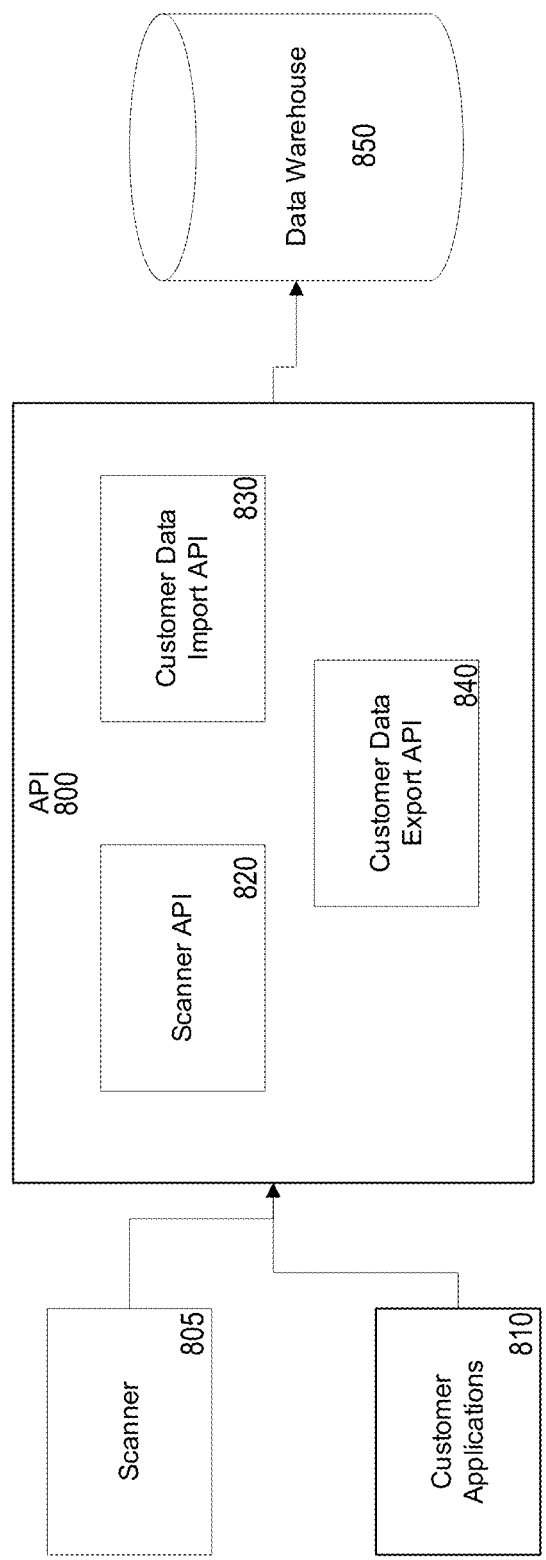
FIG. 8 illustrates an exemplary API for use in a software business management system.

Referring now to FIG. 8, an exemplary API 800 for use in a software business management system is illustrated. In some aspects, the API 800 may receive data from one or both a scanner 805 or organization applications 810. In some embodiments, the API 800 may comprise a scanner API 820, customer data import API 830, and customer data export API 840, as non-limiting examples. In some implementations, the API 800 may transmit data to a data warehouse 850, which may store analyzed and sorted data for the software business management system.

Figure 9:
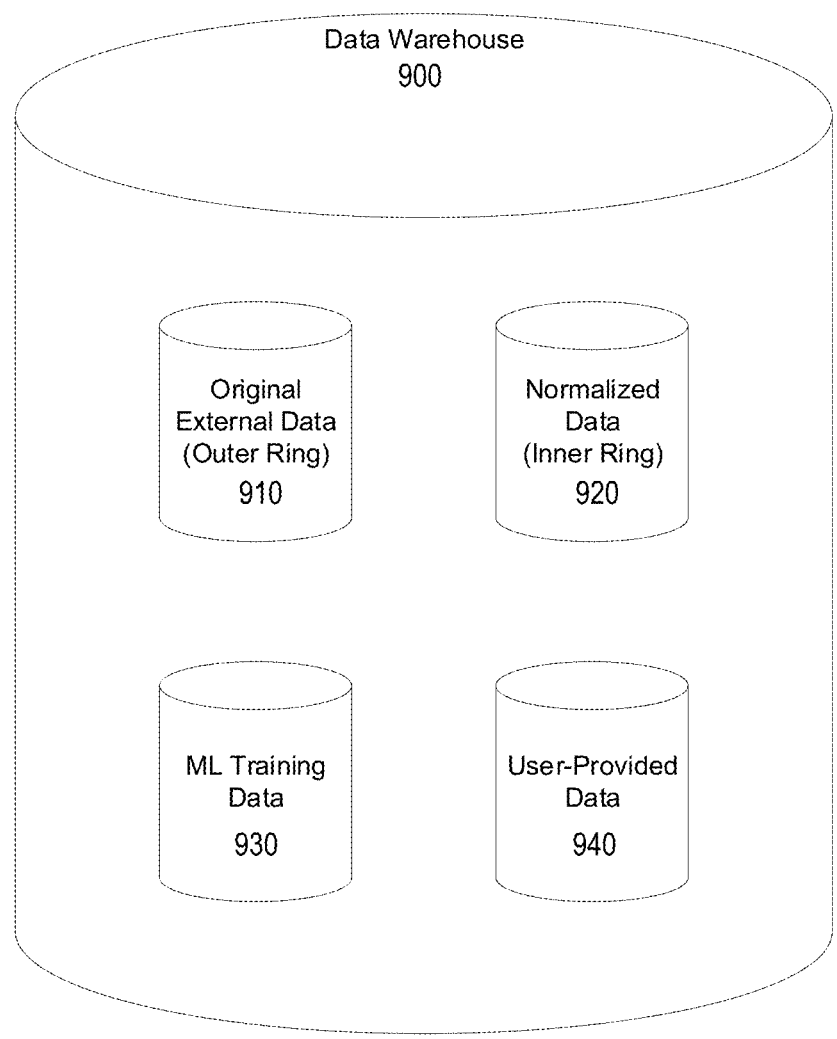
FIG. 9 illustrates an exemplary data warehouse for use in a software business management system.

Referring now to FIG. 9, an exemplary data warehouse 900 for use in a software business management system is illustrated. In some aspects, the data warehouse 900 may comprise a two stage database that may allow for a separate storage for data with differing security needs. Within the data warehouse 900, via the integration engine's normalizer, data may be transformed from its original representation as it was retrieved from an API ("outer ring") into a common, normalized format 920 ("inner ring") that may account for discrepancies between varying vendors of external data sources. The normalizer may use extract, transform, and load (ETL) techniques to transform the external data to the normalized form.

For example, original external data 910 may be stored in an outer ring and may be temporarily stored during the analysis and processing, and normalized data 920 may be stored in an inner ring, wherein the content of the original external data 910 may be separated from the normalized data 920 and analytics related to the normalized data 920. In some implementations, the data warehouse 900 may comprise machine learning training data 930, which may allow the software business management system to provide adaptive analysis that may provide more precise and customized insights over time. In some embodiments, machine learning training data 930 may be used to develop intelligent infrastructure for custom software based on analytics, insights, and identified and analyzed inefficiencies, vulnerabilities, software decay, as non-limiting examples. In some aspects, the data warehouse 900 may store user-provided data 940, which may include organization information, profile information, organization application authorization information, as non-limiting examples.

Figure 10:
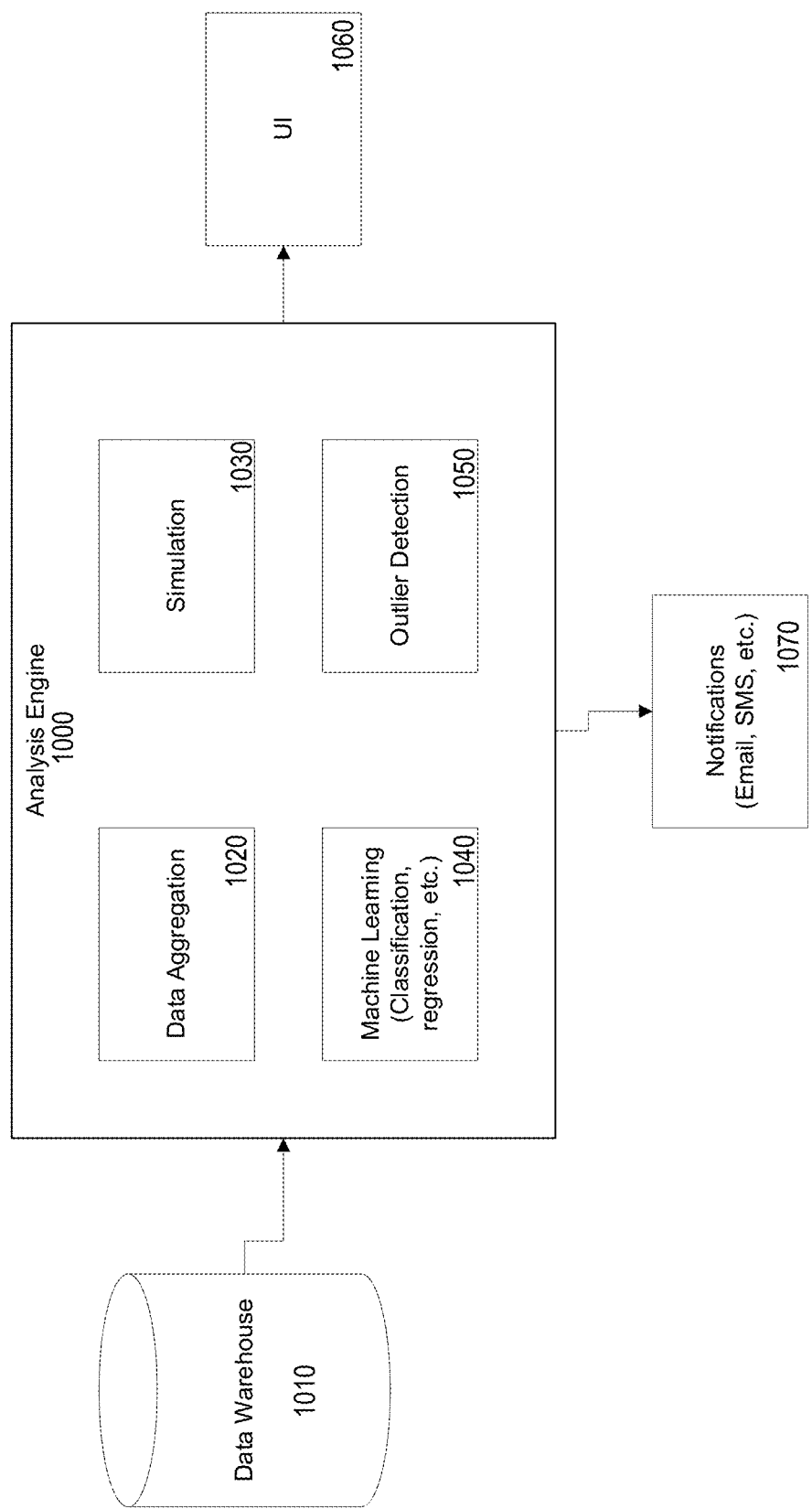
FIG. 10 illustrates an exemplary analysis engine for use in a software business management system.

Referring now to FIG. 10, an exemplary analysis engine 1000 for use in a software business management system is illustrated. In some aspects, the analysis engine 1000 may receive data from a data warehouse 1010, which may be external or integrated into the software business management system. In some embodiments, the analysis engine 1000 may comprise data aggregation 1020, simulation 1030, machine learning 1040, and outlier detection 1050, as non-limiting examples. In some implementations, notifications 1070 may be transmitted to designated users, such as executives in an organization. In some aspects, the analysis engine 1000 may receive input from a UI 1060 within the software business management system.

In some embodiments, an UI 1060 may comprise configurable dashboards visualizing key metrics for products and portfolios based on the data in the system. Visualization may include the software business management system score, cost data, budgets, quality analysis, SCA issues, lines of code, hours spent, commits to source code repositories, features, bugs, errors, performance data, frameworks, dependencies, duplicate lines of code, technical debt, communication activity, discussions, attachments, security vulnerabilities, build status and time, number of branches, derived ratios of metrics, ML classifications, team members, key events, and other outputs from the analysis engine 1000. These metrics may be visualized via a display of the metric, on a chart (such as line, bar, pie, as non-limiting examples), in a table, or otherwise. The UI 1060 may be customized to the needs of the user. The user may change the current time slice to view data in a different time period and compare time periods to one another (i.e., year-over-year).

Figure 11:
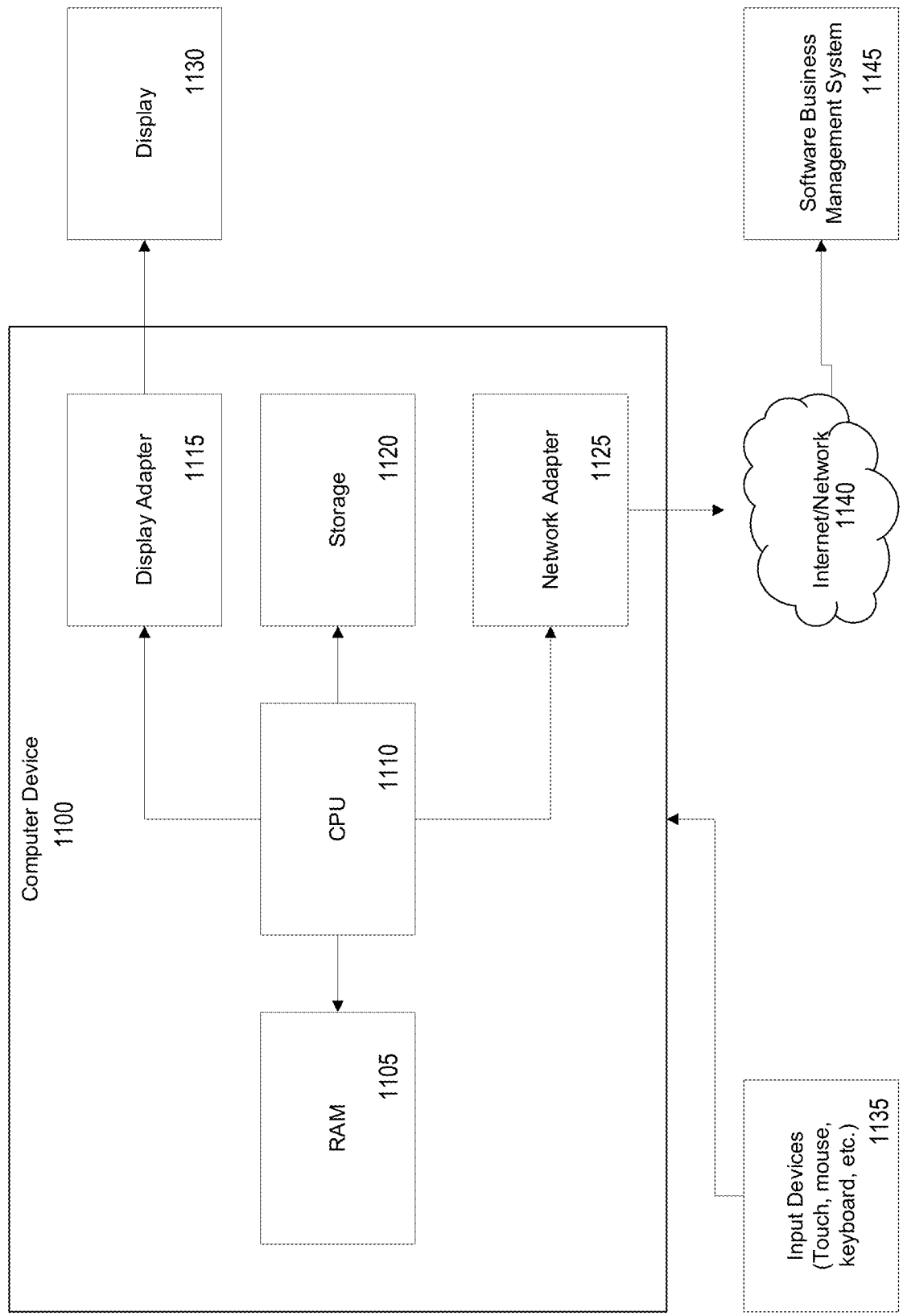
FIG. 11 illustrates an exemplary computer device for use with a software business management system.

Referring now to FIG. 11, an exemplary computer device 1100 for use with a software business management system 1145 is illustrated. In some aspects, a computer device 1100 may comprise a display 1130, RAM 1105, and a CPU 1110, which may operate with a display adapter 1115, storage 1120, and network adapter 1125, as non-limiting examples. In some embodiments, the computer device 1100 may receive input commands from an input device 1135, such as a mouse, touchscreen, or keyboard. In some implementations, the computer device 1100 may communicate with the software business management system 1145 through a wired or wireless network 1140. A computer device 1100 that may be capable of accessing a network 1140 may be used to access the software business management system 1145. The computing device 1100 may comprise a CPU 1110 and memory (RAM) 1105 with storage used for temporary files. The computing device 1100 may have a display adapter 1115 and internal or external display 1130 to view the system's UI, wherein the computer device 1100 may support user input 1135 via a touch screen, mouse, or keyboard so the user may interact with the UI. A network adapter 1125 may be used to access the system over the Internet and/or a private network.

Figure 12:
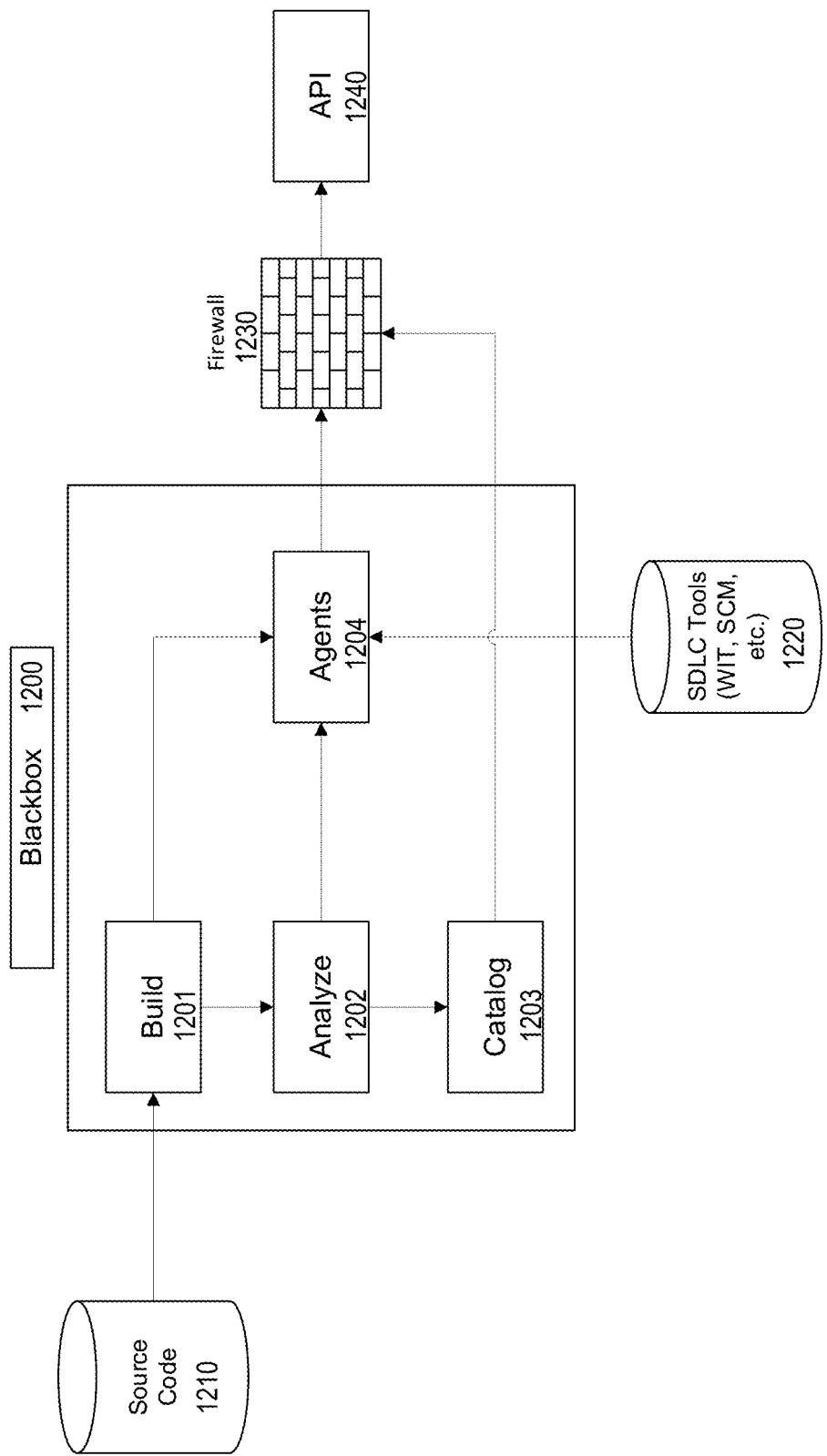
FIG. 12 illustrates an exemplary black box for use in a software business management system.

Referring now to FIG. 12, an exemplary black box 1200 for use in a software business management system is illustrated. In some aspects, the black box 1200 may be a physical or virtual appliance that may be designed to solve the problem of analyzing source code 1210 limiting the need for the source code 1210 to leave an organization's premises, wherein the black box 1200 may be located behind the organization's firewall 1230, without requiring the organization to install and configure a complex suite of tools.

In some embodiments, the black box 1200 may comprise a build service 1201, a quality analysis service 1202, and software discovery service 1203, which may provide a technology and dependency cataloging utility. In some implementations, the build service 1201 may be configured to pull the source code 1210 from a privately hosted source control repository in the organization's environment or from a cloud-hosted source control provider. In some embodiments, the code may be statistically analyzed for quality and security issues by the quality analysis service 1202.

In some aspects, a software discovery service 1203 may catalog the technologies and dependencies in the application and reports its data up to the cloud API 1240 through the firewall 1230. In some implementations, after the build, agents 1204 may pull metadata from the build service 1201, quality analysis service 1202, and SDLC tools 1220 in the environment (such as work item tracking or source control), and may report the metadata up to the cloud API 1240 through the firewall 1230 without the code leaving the environment.

Figure 13:
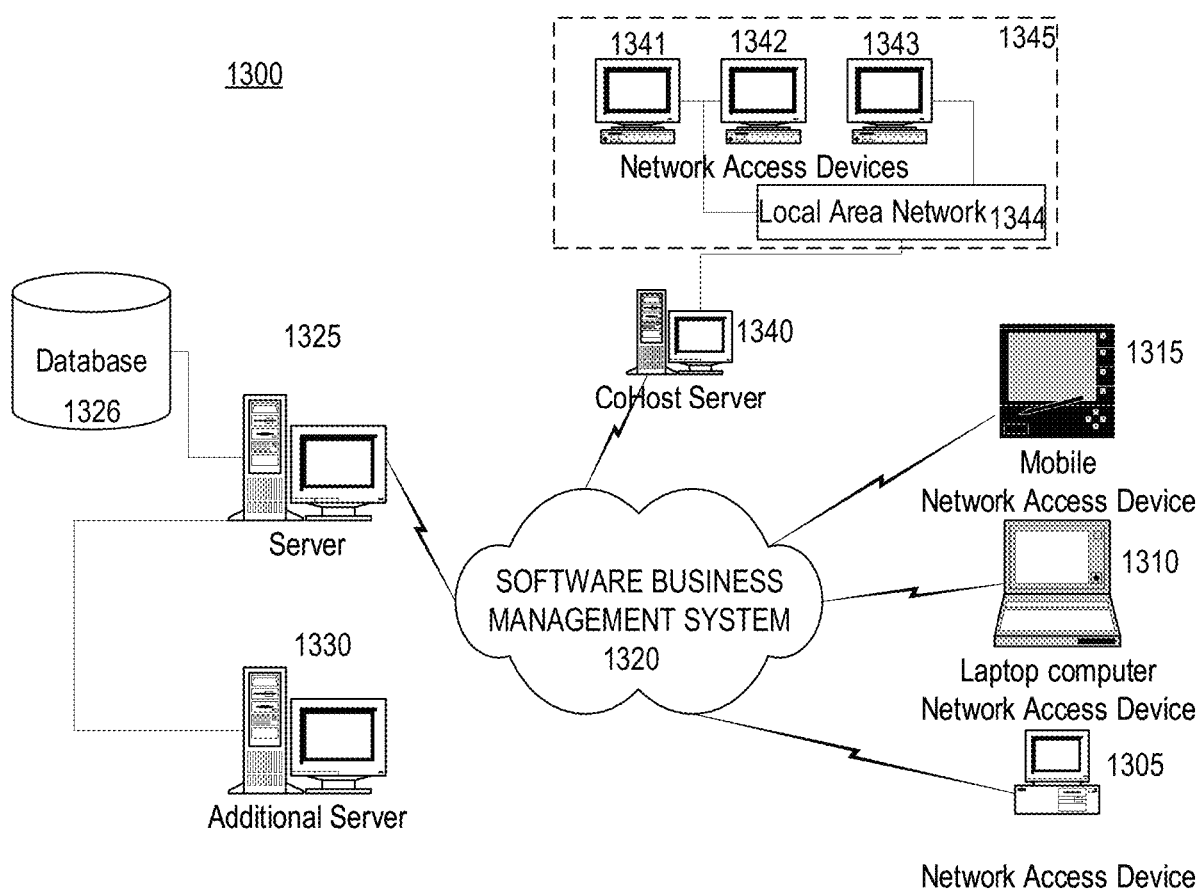
FIG. 13 illustrates an exemplary processing and interface system.

Referring now to FIG. 13, an exemplary processing and interface system 1300 is illustrated. In some aspects, access devices 1315, 1310, 1305, such as a paired portable device 1315 or laptop computer 1310 may be able to communicate with an external server 1325 through a software business management system 1320 through cloud-based communications. The external server 1325 may be in logical communication with a database 1326, which may comprise data related to software identification information and associated profile information. In some embodiments, the external server 1325 may be in logical communication with an additional server 1330, which may comprise supplemental processing capabilities. In some implementations, the external server 1325 may be in logical communication with multiple databases. In some aspects, the software business management system 1320 may be running on an external server 1325.

In some aspects, the server 1325 and access devices 1305, 1310, 1315 may be able to communicate with a cohost server 1340 through a software business management system 1320. The cohost server 1340 may be in logical communication with an internal network 1345 comprising network access devices 1341, 1342, 1343 and a local area network 1344.

Figure 14:
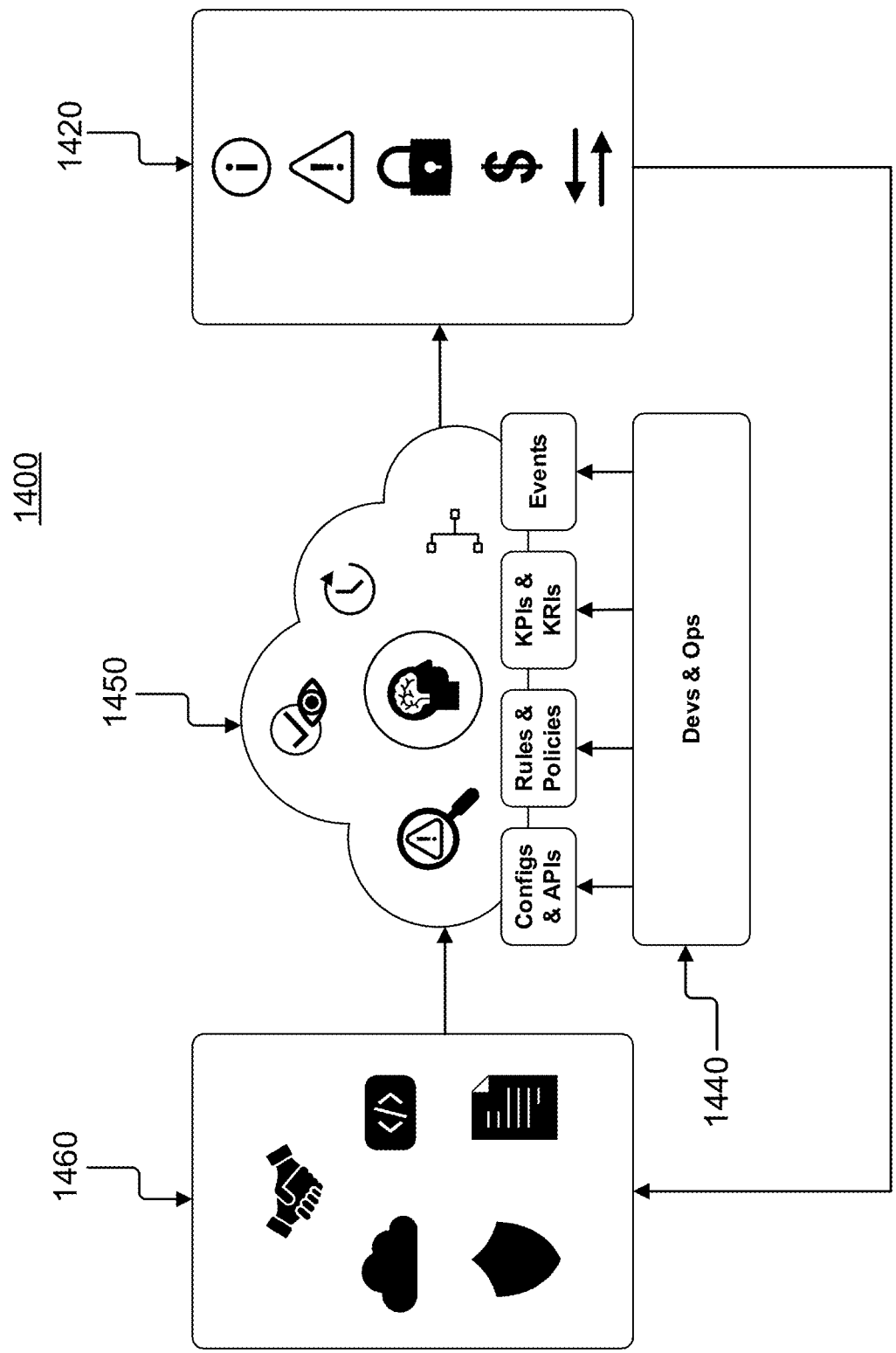
FIG. 14 illustrates an exemplary software business management system.

Referring now to FIG. 14, an exemplary software business management system 1400 is illustrated. In some embodiments, the software business management system 1400 may comprise a discovery tool 1460. In some implementations, the software business management system 1400 may comprise a discovery tool 1460 installable on one or more organization servers, an integration engine 1440, and an analytics engine 1440, as non-limiting components.

In some aspects, the discovery tool 1460 may be configured to access an organization environment, identify a plurality of organization applications, monitor the plurality of organization applications, and collect organization application data, as non-limiting examples. In some embodiments, the discovery tool 1460 may be further configured to score the plurality of organization applications. In some implementations, the discovery tool 1460 may be further configured to identify inventory within the organization environment, monitor the inventory, and collect inventory data, as non-limiting examples.

In some embodiments, the integration engine 1440 may be configured to convert or translate the organization application data into universal data, where the universal data includes a common format and store the universal data in an external data warehouse. In some implementations, an analytics engine 1450 may be configured to access the external data warehouse and analyze the universal data, where an analysis output may comprise analytics 1420 that may comprise insights related to the plurality of organization applications.

In some aspects, the analytics 1420 may comprise a performance analysis of at least a portion of the organization applications. In some embodiments, the software business management system 1400 may comprise an administrative interface, where the analytics engine 1450 may be further configured to create reports based on the insights that may be viewable in the administrative interface.

In some implementations, the software business management system 1400 may operate continuously with a recursive pattern. In some embodiments, the software business management system 1400 may repeat the aggregation of organization applications to provide further analytics 1420 and insights after the previously proposed analytics 1420 have successfully been integrated into the organization environment. In some implementations, previous analytics 1420 may be stored within an analytics history.

Figure 15:
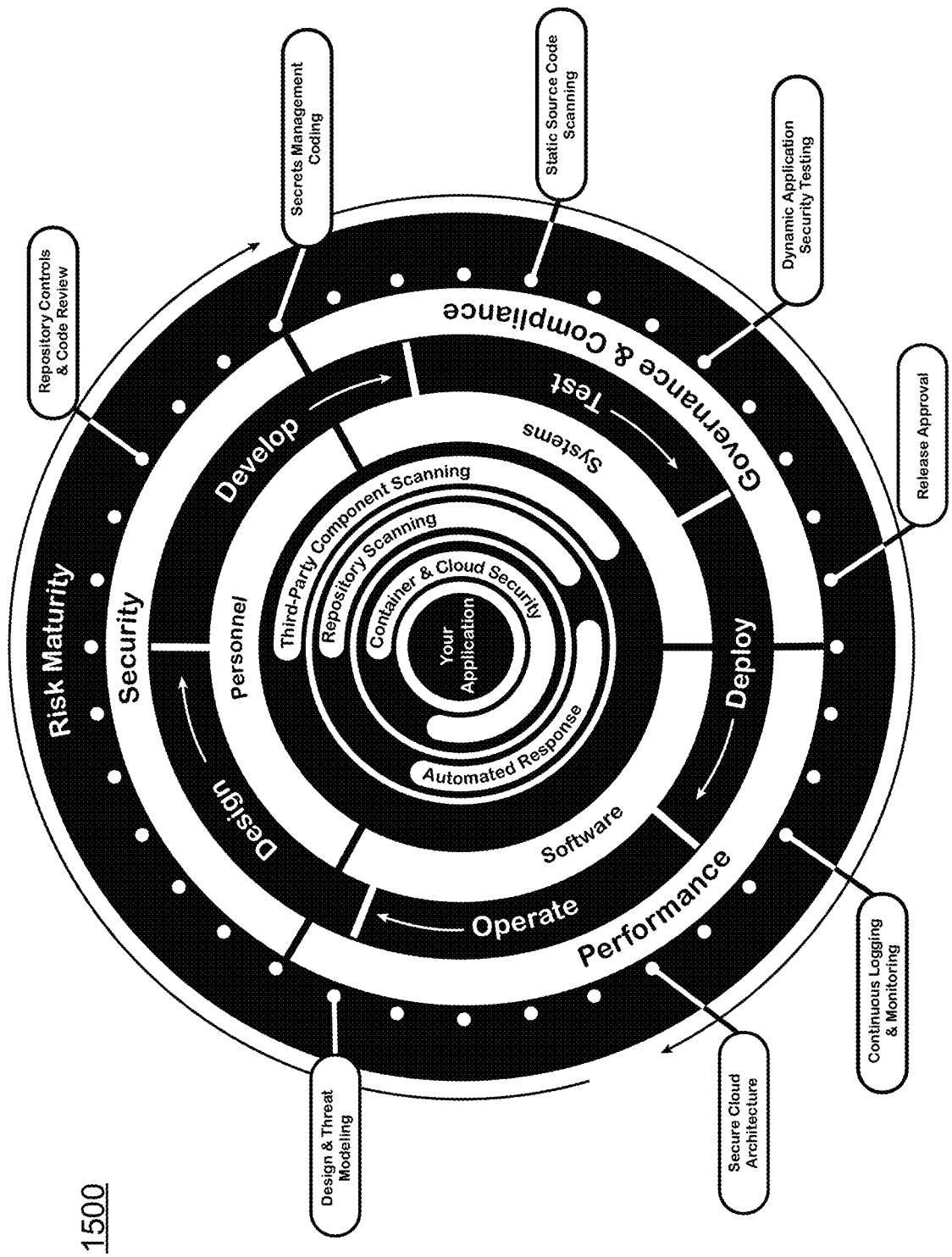
FIG. 15 illustrates an exemplary software business management system.

Referring now to FIG. 15, an exemplary software business management system 1500 is illustrated. In some embodiments, the software business management system 1500 may center personnel, software, tools, processes, infrastructure, technologies, customers or users, and other operational procedures by application, product, or entity within the organization environment. In some implementations, the integration and analytics engines may provide analytics as correlated with a product.

In some embodiments, the software business management system 1500 may provide high levels of contextualization when analyzing an organization environment. In some implementations, the software business management system 1500 may provide sufficient contextualization that correlates all aggregated information with a product, products, and entities.

In some aspects, the software business management system 1500 may comprise a plurality of controls and evaluative procedures such as container and cloud security, repository scanning, automated responses, and third-party component scanning, as non-limiting options. In some embodiments, the software business management system 1500 may analyze personnel, software, systems, tools, and technologies, as non-limiting examples. In some implementations, the software business management system 1500 may evaluate and correlate higher-level systems such as security, performance, governance, and compliance, as non-limiting examples, and contextualize them in terms of existing projects and products.

In some aspects, the level of security levels may increase over time as the software business management system 1500 performs security, diagnostic, evaluative, and analytical procedures, as a non-limiting list, on existing information within the organization environment. These procedures may include, but not be limited to, repository controls and code review, secrets management coding, static source code scanning, dynamic application security testing, release approval, continuous logging and monitoring, secure cloud architecture, and design and threat modeling.

In some embodiments, the risk levels may contextualize report information and provide all analytics in context of their related product. This contextualization may enable the software business management system 1500 to assign specific people and organizations within the organization environment to maintain security and suggested improvements, as they correlate with the specified product the personnel is assigned to. This approach provides for accountability and implementation tracking that can actively be enforced with people associated with the discovered inefficiencies and vulnerabilities in the product systems.

As an illustrative example, a company specializing in manufacturing may receive insights that provide contextual analytics about the inefficiencies of the production line. The company may receive analytics that specify deficiencies with lead times on the production floor, frequent bottlenecks in the supply chain, security vulnerabilities of the production software, and associate all analytics with the lead engineer and managing supervisor over the production line. Correlating analytics with products and their respective production lines may allow the software business management system 1500 to provide a distinct venue of remediation that is precise at eradicating deficiencies within the organization environment.

In some embodiments, the software business management system 1500 may comprise an integration engine 1540 that may aggregate information from personnel, systems, and software, as non-limiting examples. In some implementations, the integration engine 1540 may be configured to convert or translate the organization application data into universal data, where the universal data includes a common format. In some aspects, the analytics engine 1550 may comprise comparative analytics to predetermined metrics such as security parameters, governance and compliance standards, and corporate performance metrics, as non-limiting examples.

In some embodiments, the analytics engine 1550 may utilize formulated analytics to extrapolate and calculate additional evaluative insights. As an example, the analytics engine 1550 may use comparative analytics of performance metrics to provide risk predictions for current and outstanding projects within the organization environment. The analytics engine 1550 may provide risk indicators for accepting new projects in consideration of available resources such as, budget, employee availability, and hardware specifications.

As additional products are produced and recommended insights are integrated into the existing organization environment, the analytics engine 1550 may receive the updated universal data from the integration engine 1540 and supplement existing risk estimates with the additional data. Over time, the aggregation of data history may allow the analytics engine 1550 to develop risk maturity and improve the accuracy of risk predictions.

Figure 16A:
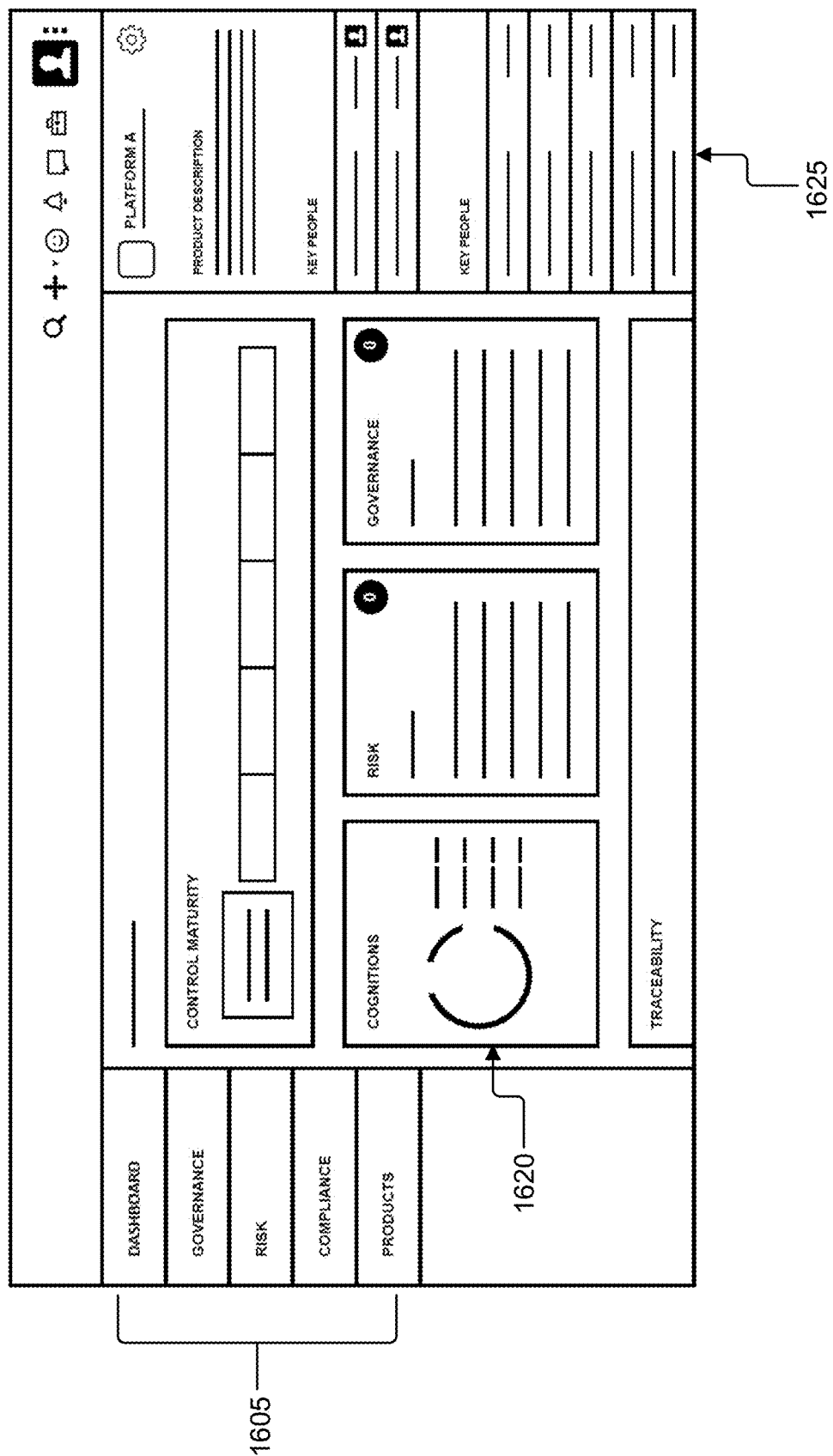
FIG. 16A illustrates an exemplary graphical user interface.
Figure 16B:
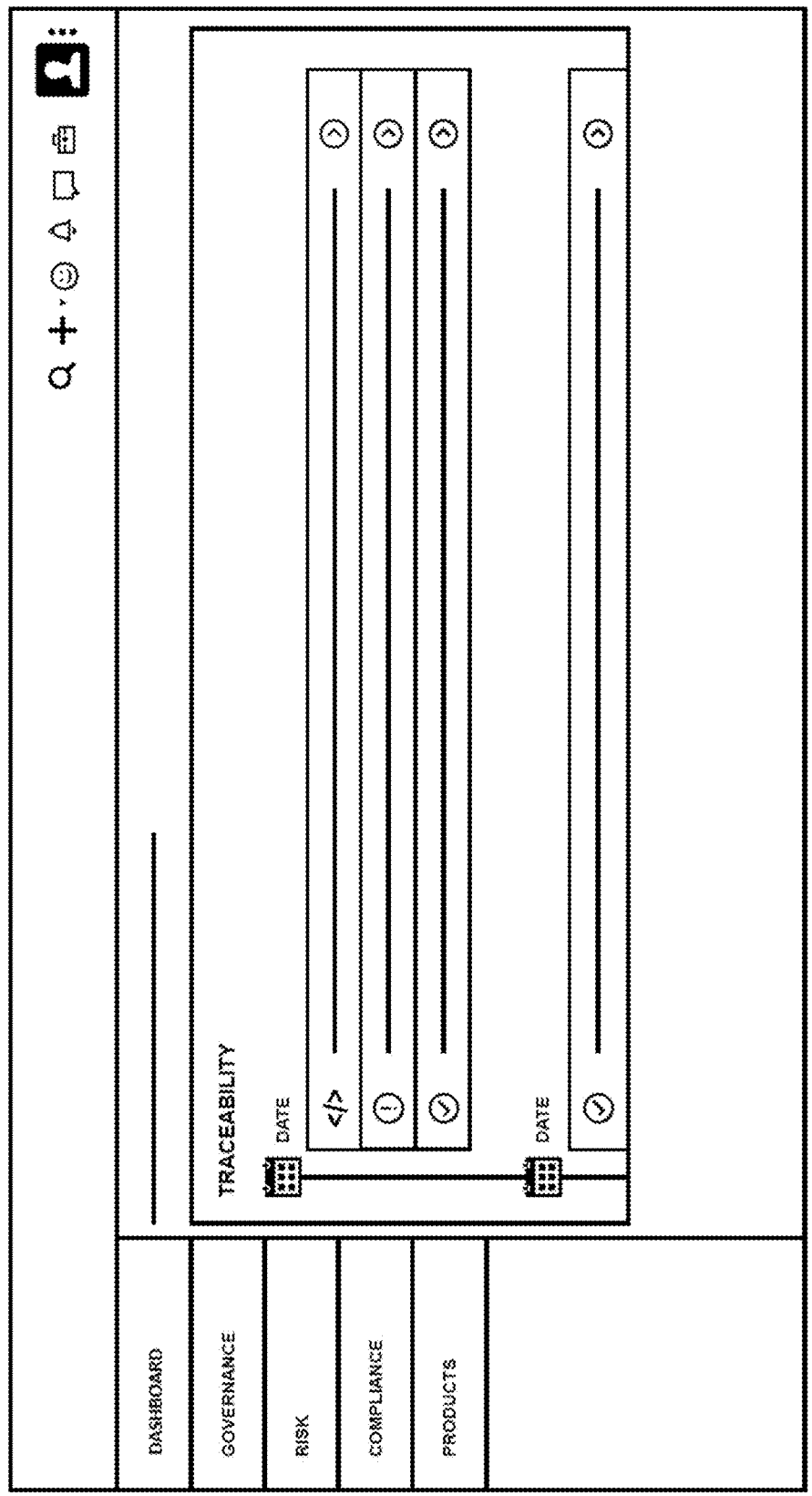
FIG. 16B illustrates an exemplary graphical user interface.

Referring now to FIG. 16A-B, an exemplary interface 1600 is illustrated. In some embodiments, the interface 1600 may comprise one or more menus 1605. In some implementations, the menu 1605 may comprise a plurality of visualizations that inform the user of a plurality of segmented analytics 1620. As an example, the analytics engine may produce analytics on predetermined categories such as governance, risk, and compliance. In some aspects, the menus 1605 may adapt and the software business management system may propose additional segmented aggregations of analytics 1620 based on the analyzed universal data.

As an example, a company may create a new division of products that are better measured by the time required to produce the product than the new division's alignment with irrelevant existing product standards. As a result, the software business management system may propose a menu category for "Production" that may provide analytics 1620 tailored to supply chain and process flow dynamics and inefficiencies.

In some embodiments, the interface 1600 may comprise insights 1625. In some implementations, the insights 1625 may elaborate on the analytics 1620 provided by the analytics engine. In some aspects, the insights 1625 may provide product-specific information about the analytics 1620 such as key personnel and a brief product description, as non-limiting examples. In some embodiments, the insights 1625 may comprise actionable tasks that may improve the analytics 1620 provided by the analytics engine.

In some implementations, the insights 1625 may provide a method to directly interface with existing personnel and infrastructure that would be able to integrate solutions proposed by the insights 1625. In some aspects, the interface 1600 may comprise a history of completed tasks and actionable items for future reference. This history may be especially helpful as iterative insight 1625 tasks are completed and the organization environment evolves through the applied improvements. Referencing an insight history may allow for assessment of progress and evaluation of present insights 1625 in consideration of previously received insights 1625.

Figure 17:
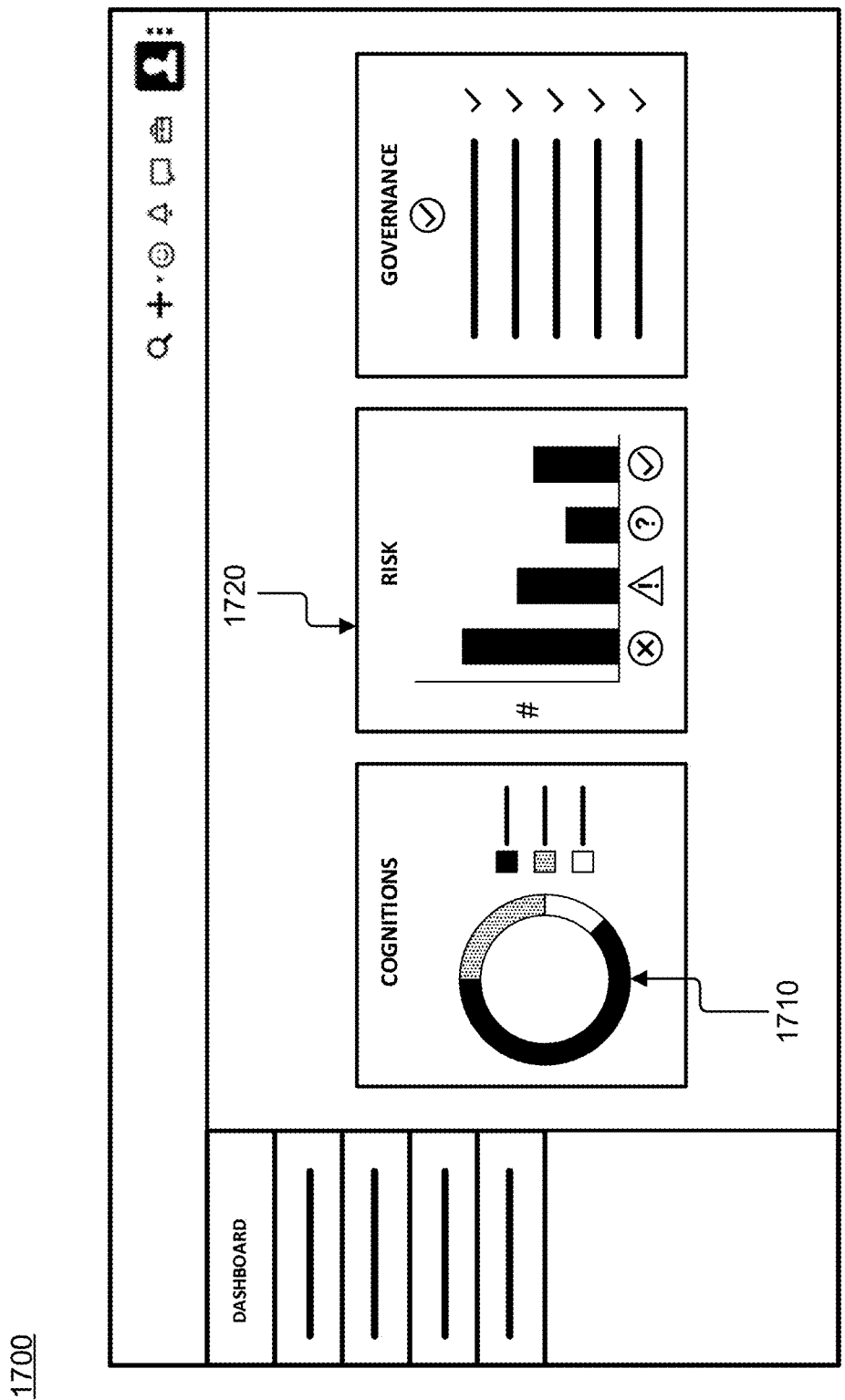
FIG. 17 illustrates an exemplary graphical user interface.

Referring now to FIG. 17, an exemplary interface is illustrated. In some embodiments, the interface 1700 may comprise analytics 1720. In some implementations, the interface may comprise visualizations 1710. In some aspects, the visualizations 1710 of the analytics 1720 may allow for the presentation of large quantities of universal data in a concise representation. In some embodiments, the visualizations 1710 may provide indicative analytics 1720 for a plurality of products. In some implementations, the scope of the visualizations 1710 may be predetermined by the user.

As an illustrative example, the CEO of a large corporation may be interested in viewing the analytics 1720 for the corporation as a whole and, upon viewing the analytics 1720, may wish to view the analytics 1720 by department to discover further needed improvements for the organization environment. The selected visualizations 1710 may present categories for the department such as risk, cognitions, and terms of governance, that may provide the CEO with the details of the product-based insights upon further visualization scope selection.

Figure 18A:
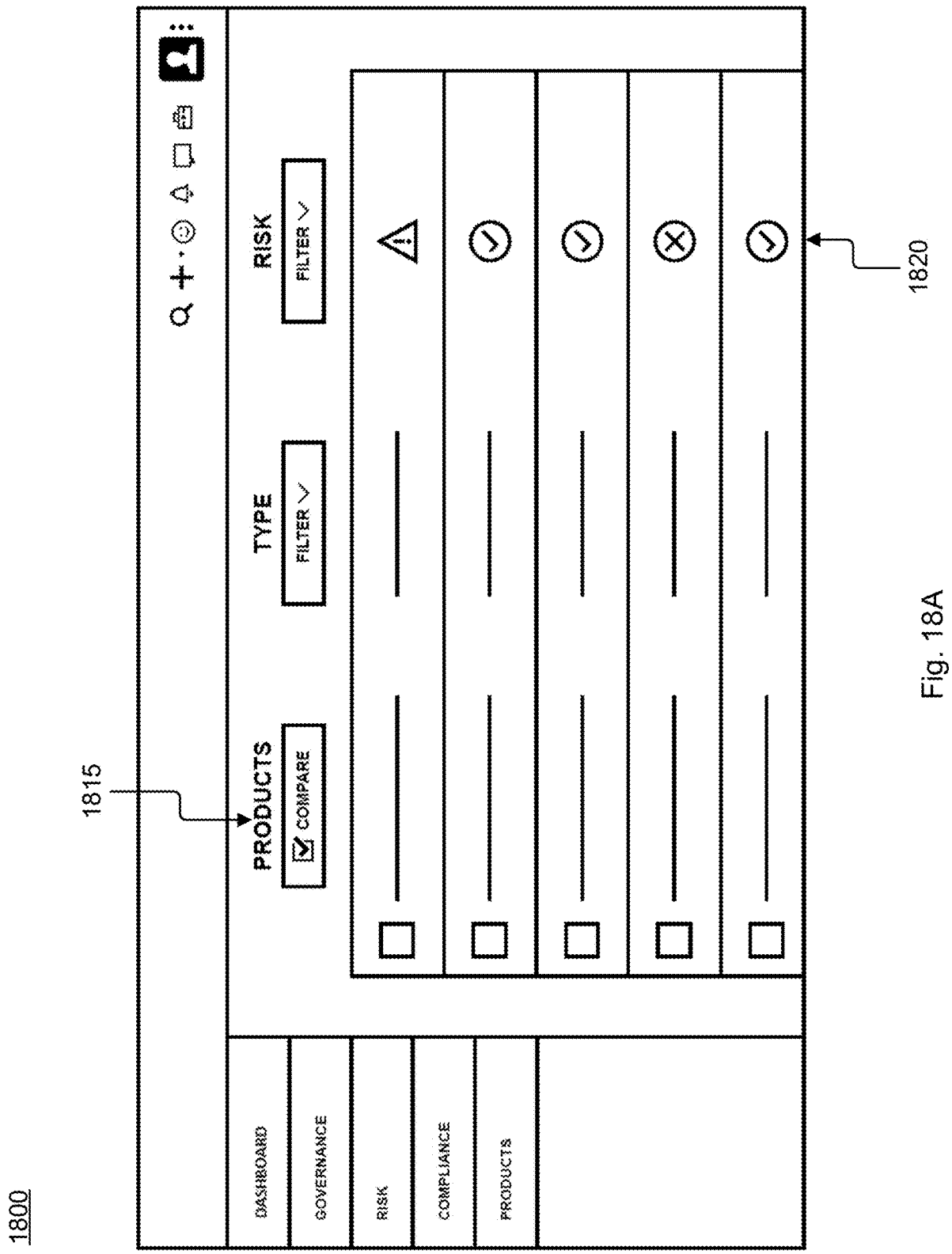
FIG. 18A illustrates an exemplary graphical user interface.
Figure 18B:
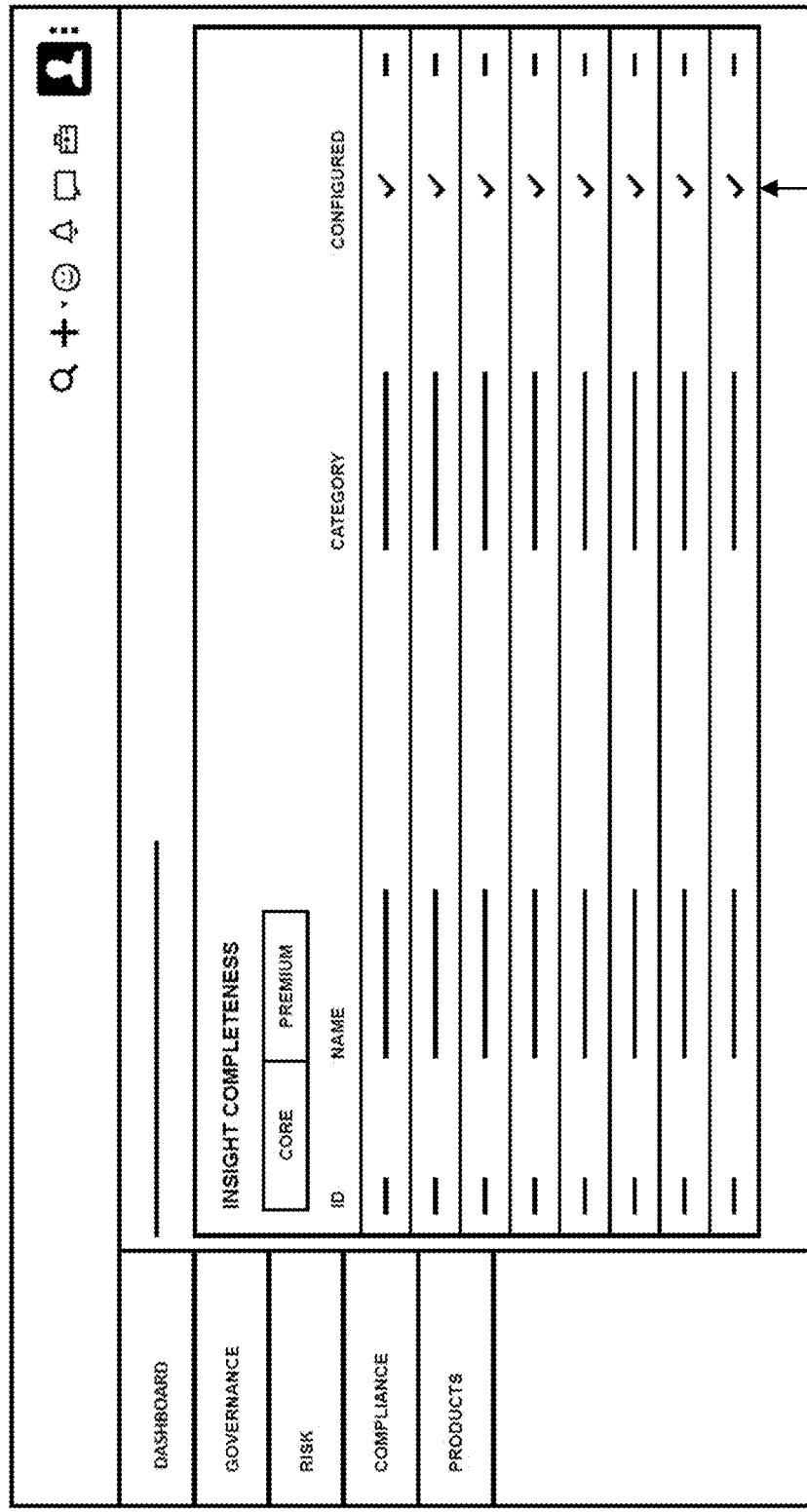
FIG. 18B illustrates an exemplary graphical user interface.
Figure 18C:
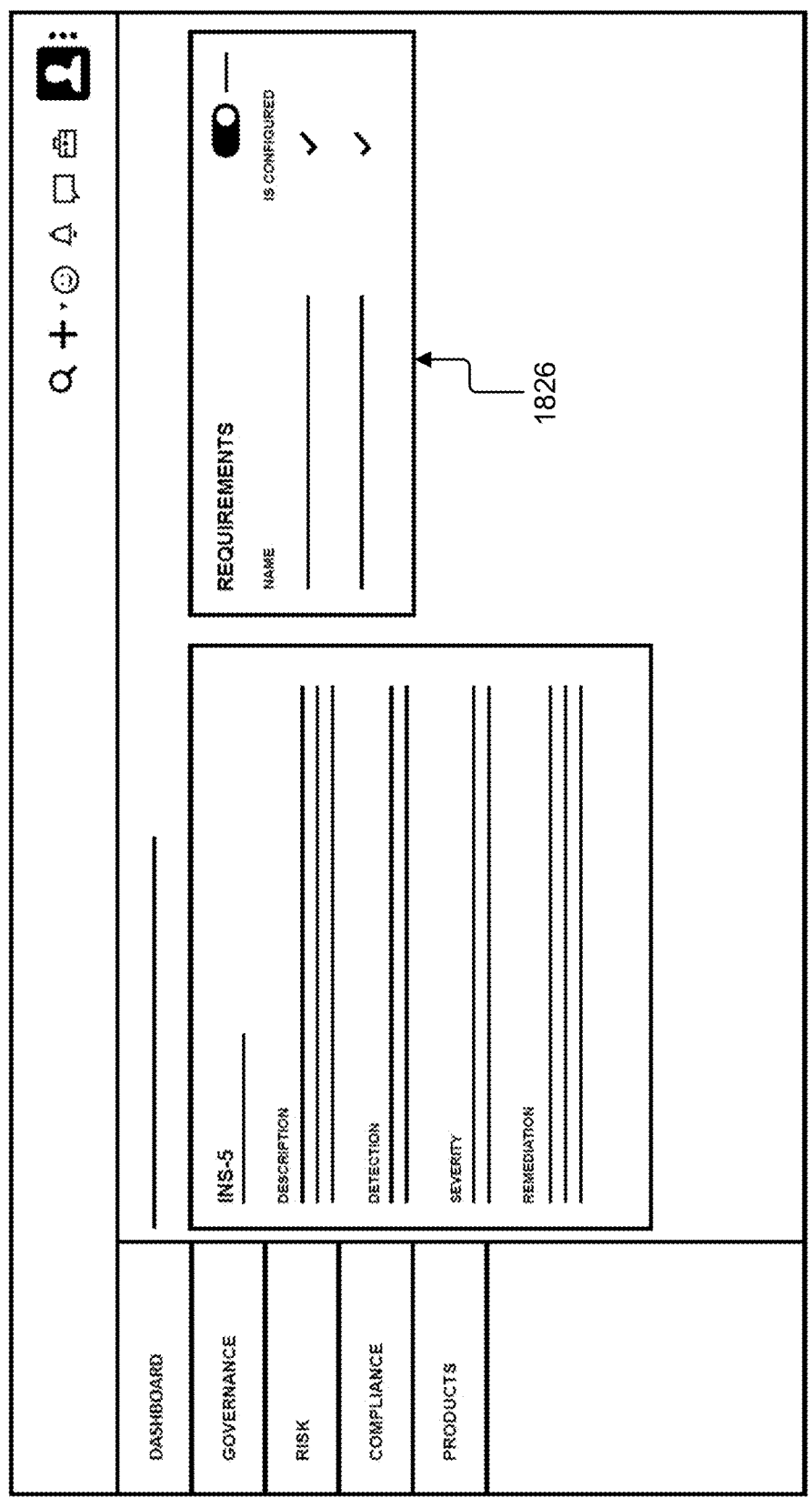
FIG. 18C illustrates an exemplary graphical user interface.

Referring now to FIG. 18A-C, an exemplary interface 1800 is illustrated. In some embodiments, the interface 1800 may comprise external data 1815. In some implementations, the interface 1800 may comprise analytics 1820. In some aspects, the interface may correlate analytics to predetermined attributes of the external data 1815 such as the products within the organization, as a non-limiting example.

In some embodiments, the interface 1800 may comprise a plurality of predetermined filters and selection methods. In some implementations, the plurality of external data may allow the user to perform customized secondary comparative analysis using the computed analytics 1820. For example, a user may be able to view three products from three different departments and evaluate differences in risk and compliance between the products.

In some aspects, the interface 1800 may comprise insights 1825, 1826. In some embodiments, the insights may comprise visualizations that establish the insights correlated with the predetermined standards of the organization. In some implementations, the predetermined standards of the organization may comprise organization-based standards as well as predefined industry standards.

In some aspects, the insights 1825 may comprise additional descriptive insights 1826. In some embodiments, the insights 1826 may comprise conformity information relating to the specific predetermined standards correlated with that insight 1826. In some implementations, details of the insight 1826 may comprise a brief description, severity, detection, and remediation recommendations, as non-limiting examples. In some aspects, the insights 1826 may be associated to predetermined organization standards to provide specific remediation information. As an example, an insight 1826 may provide a security remediation that may be inapplicable without a specific recommendation of what protocol is in violation. The security measures can then be implemented to align current procedure with the specified security protocol.

Figure 19A:
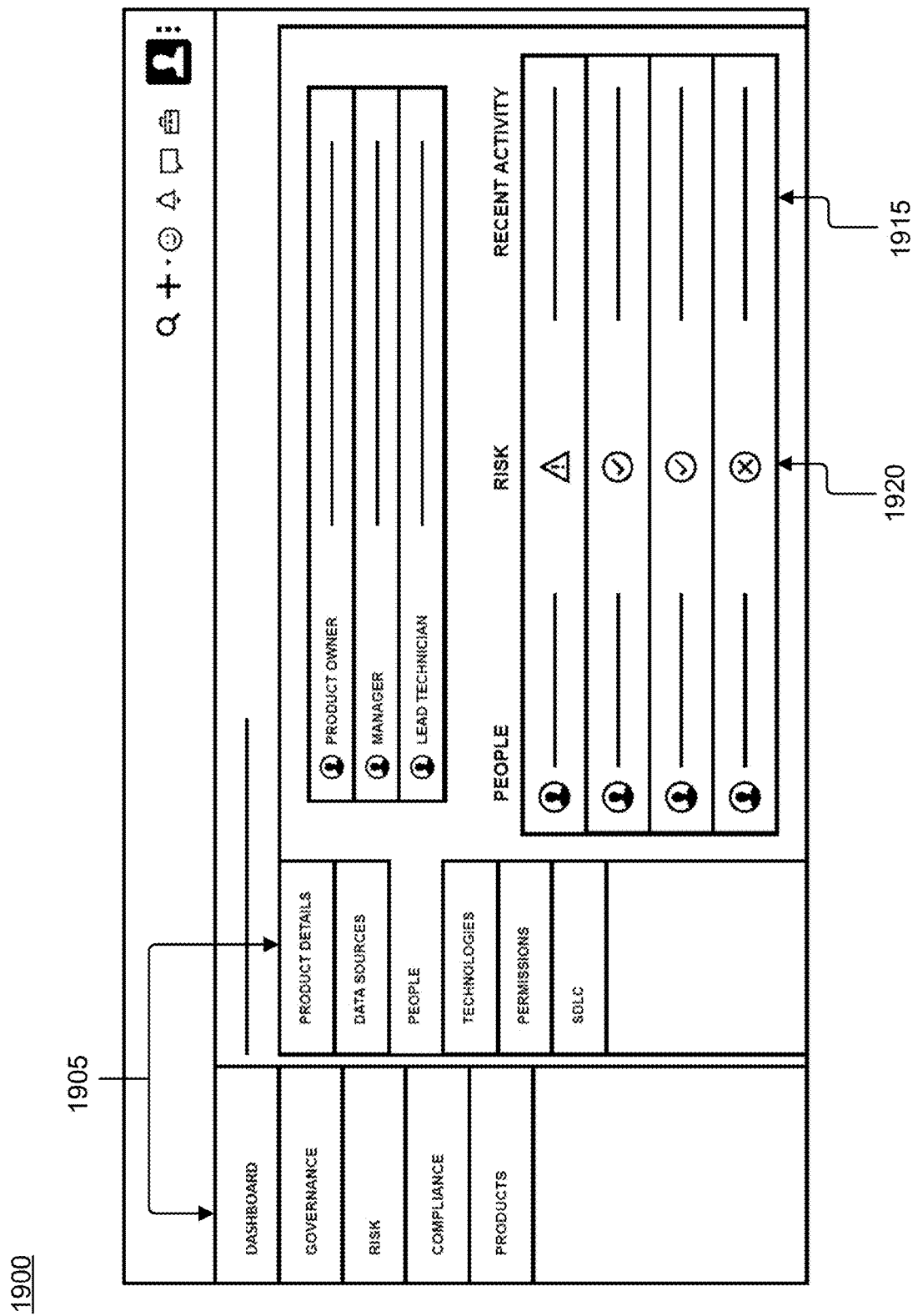
FIG. 19A illustrates an exemplary graphical user interface.
Figure 19B:
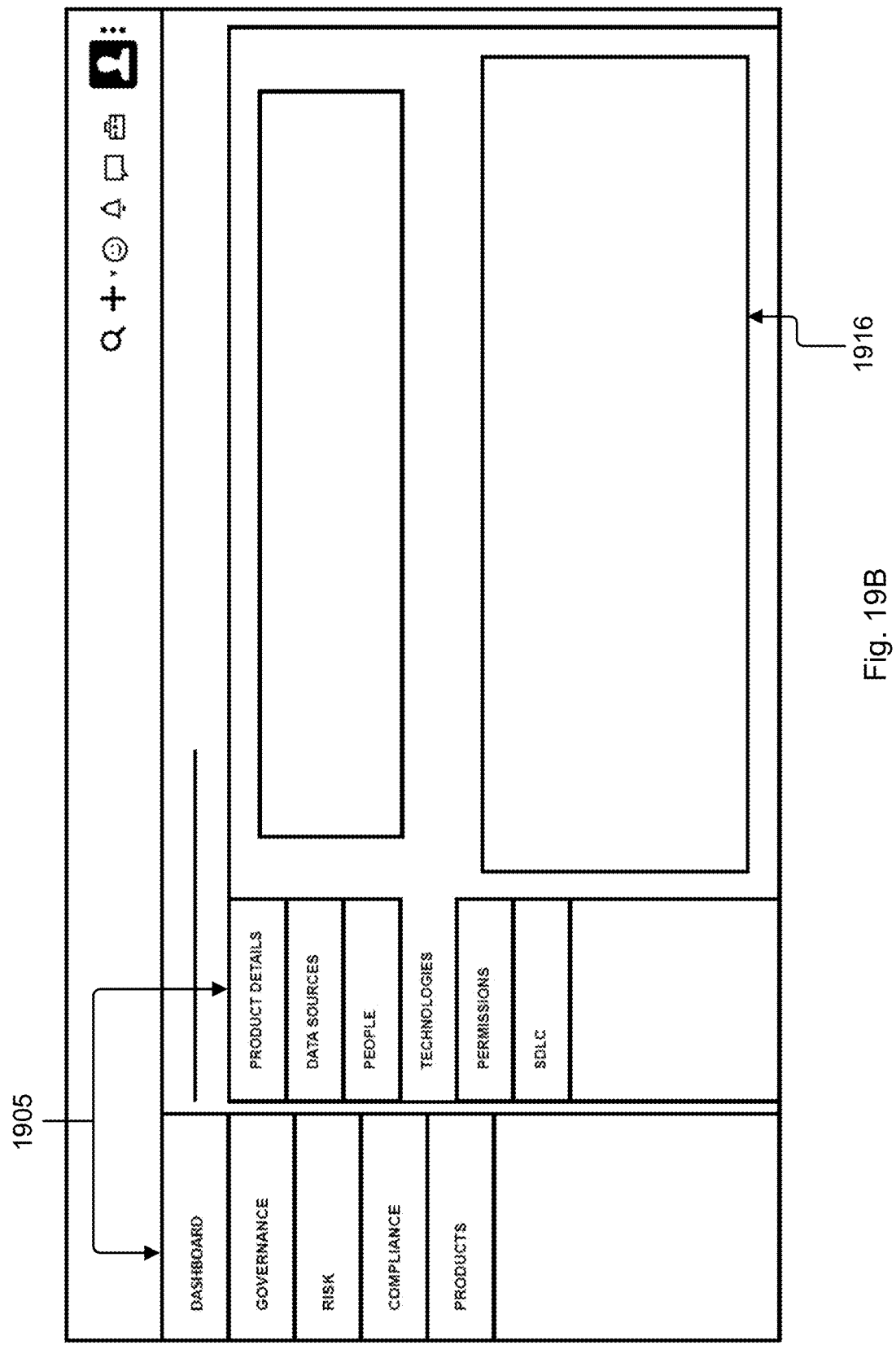
FIG. 19B illustrates an exemplary graphical user interface.

Referring now to FIG. 19A-C, an exemplary interface 1900 is illustrated. In some embodiments, the interface 1900 may comprise one or more menus 1905. In some implementations, the menu 1905 may comprise a plurality of visualizations that inform the user of a plurality of segmented analytics 1920. As an example, the analytics engine may produce analytics on predetermined categories such as governance, risk, and compliance. In some aspects, the menus 1905 may adapt and the software business management system may propose additional segmented aggregations of analytics 1920 based on the analyzed universal data. In some embodiments, the menu 1905 may comprise a plurality of menus 1905 that enable the user to view additional details about suggest analytics 1920, insights, and other product-related data.

In some implementations, the interface 1900 may comprise analytics 1920. In some aspects, the interface 1900 may comprise external data 1915, 1916, 1917. In some embodiments, the interface 1900 may provide external data 1915 as contextual information for analytics 1920. As an example, users, products, tools, processes, technologies, and related external data 1915 may be associated with indicated levels of risk that correlate to recent related activities and predetermined organization standards.

In some aspects, acceptable threshold risk levels may be set, such as based on industry compliance standards or predefined organization standards. For example, an acceptable threshold risk level associated with a general administrative department may be higher than that associated with data compliance or invoicing, as those departments may have stricter compliance standards. In some embodiments, an acceptable threshold risk level may be based on aggregated or averaged risk of a plurality of software assets and entities. These assets and entities may be associated with multiple aspects, such as products, processes, tools, and personnel. In some aspects, the acceptable threshold risk level may determine the highest acceptable risk for any product or personnel.

In some embodiments, the risk levels may be defined by what tools and configurations need to be connected to a personnel, software, tools, processes, infrastructure, technologies, customers or users, and other operational procedures by application, product, or entity, such as described and illustrated in FIG. 15. In some implementations, these configurations may comprise security and compliance requirements, as non-limiting options. Measurement by tools and configuration may allow the business software management system to monitor for the deployment of those tools and then, continuously, identify adherence to one or more best practices, regulatory compliance, and company policies.

This continuous controls monitoring may comprise autonomous supervision and management of components such as, but not limited to, risk levels, maturity assessment, the current configuration of the integration engine, and the relevant product-based contextualization of information generated by the integration engine. In some aspects, a performance analysis may comprise a measurement of effective controls and for identification of exceptions, deficiencies, and failures in a product-based context.

In some implementations, the interface 1900 may display external data 1917 imported by the integration engine. In some aspects, the interface may comprise external data 1916 related to third party technologies used by the organization. This external data 1916, 1917 may allow the analytics engine to perform a cross-tool data analysis. These analytics 1920 may provide insights that may comprise measures and protocols of external data integration that may be improved upon or better secured, as non-limiting alternatives.

Referring now to FIG. 20, an exemplary software business management system 2000 is illustrated. In some embodiments, the software business management system 2000 may comprise one or more programs 2070, 2071, 2072. In some embodiments, the software business management system 2000 may comprise an analysis of one or more programs 2070, 2071, 2072. In some aspects, the analytics engine may comprise a correlation engine that assesses the impact of correlations between products within the organization environment.

In some implementations, the analytics engine may comprise an analysis of high risk combinations. As an example, the analytics engine may provide security insights into a program 2072 that may have been marked as completed three years ago that has registered recent activity. These insights may allow the software business management system 2000 to notify an organization of activities that may seem regular in execution, but irregular in frequency or the timeframe in which they are executed.

In some aspects, the correlation engine may conduct an analysis of high risk combinations. In some embodiments, a high-risk combination may comprise one or more high risk scenarios. As an example, the software business management system 2000 may retain a record of a security breach on an inactive project 2072 that occurred two years ago and recognize similar patterns within an active project that may repeat the previous security vulnerability.

In some implementations, high risk scenarios may enable the software business management system 2000 to form indicative correlations between data that may otherwise remain disconnected or uncorrelated in separate departments. Other sources of aggregated analysis may comprise siloed toolsets and software products scattered across two or more teams. Correlating this data from these silos enables the software business management system 2000 to illuminate unknown risks, compromise, and insider threats. In some aspects, the high risk scenarios may be combined with historical events in a contextualized manner to evaluate high risk combinations.

As an illustrative example, a company may utilize software with malicious code that may not be in an open-source library and may in fact be signed by a valid certificate. "Software Composition Analysis" (SCA), which is a tool typically found in these environments at the developer-level, only identifies third-party and open-source software vulnerabilities, which may not be effective in detecting malicious code in a personal code repository. Additionally, code signing may only ensure the code has not been tampered with, without the capacity to identify malicious code.

Furthermore, these may be only two tool categories out of twenty to fifty tools in a toolchain that spans several teams and departments. Threats, vulnerabilities, risks, and events may be locked within these tools may reside only at the team-specific levels such as security, infrastructure, development, and operations. In contrast to the described existing software, the software business management system 2000 may allow the mapping of historical correlations to provide prioritized investigatory alerting of potential malicious modifications or insecure changes and fixes that may alert back to application or product-centric stakeholder dashboards as well as the enterprise-wide dashboards.

In some embodiments, when code is changed, the software business management system 2000 may create a trusted baseline of verified team members and code authors, a software bill of materials specific to each product or application, including its underlying dependencies and their security vulnerabilities. In some implementations, this contextualization and baseline may measure the inventory of each product's supporting code, infrastructure, tools, controls, configurations, team members, certificates, security issues, and behaviors, as a non-limiting list. As such, it may also measure performance of remediation activities, disengagement, noncompliance, and bad actors or potential malicious intent.

In some aspects, the contextualization and baseline formulation may enable the software business management system 2000 to automate the detection of anomalies, exceptions, deficiencies, and failures. In some embodiments, the software business management system 2000 may alert of an found anomalies. As an illustrative example, the software company previously mentioned may have changed a code repository from private to public. The software business management system 2000 may provide remediation immediately, and alert accountable risk owners to investigate and determine if the repository is intended to be made public.

Subsequently, whether this was done in error or if it was the result of a security breach, the software business management system may alert if the repository was not changed back to private. The software company may decide to delay addressing the issue for over a year. The business software management system 2000 may retain a record of this vulnerability or potential security breach on the active product in which it occurred and provide alerts to potentially malicious activity in the source control system for any code committed that falls outside standard practices and security policies independent of any tool.

As another example, with code signing tools, any code, or code revision, that a developer checks in, is signed by that developer using their own signing key. Integrity checks are used throughout the entire process to verify the signing key. The business software management system 2000 may alert if a legitimate code is not being used and if the customary code signing schemes are not being used.

In some embodiments, the business software management system 2000 may detect and alert if an unauthorized individual has added code to a repository across their entire product or application portfolio. This may determine if anyone was interfering with their codebase and secretly installing backdoors or malware. This may include team members who had revoked access or are no longer part of that team.

Similarly, any patterns within an active or unactive project, product, application, or entity, as a non-limiting list, that may repeat any previous security vulnerability or control weakness would be detected and correlated with other high-risk scenarios. Additionally, software decay may be a time-based factor that may also determine risk. In some implementations, combining at least one high risk scenario if it happens more than once over time may produce a high-risk combination. In some aspects, the business software management system 2000 may enable anomaly detection all the way through the build and runtime processes so unknown risks, compromise, insider threats, and malicious code or activity may be detected.

In some implementations, the insights may be presented to the organization whether the projects 2070, 2072 are in connected departments or independent departments. This allows the software business management system 2000 to provide cross-tool data insight that may otherwise be overlooked if that infrastructure or portions of an organization's infrastructure are analyzed independently.

In some aspects, the software business management system 2000 may recognize projects 2070, 2071, 2072 that may be interconnected or that share the same source material, as non-limiting examples, and may provide insights in how to protect programs 2070, 2071 if a related program is comprised 2072.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multi-tasking and parallel processing may be advantageous. Nevertheless, it will be understood that various modifications may be made without departing from the spirit and scope of the claimed disclosure.

What is claimed is:

1. A system for visualizing and analyzing at least one software assets within an organization, wherein the system comprises:
   an analytics engine configured to analyze at least a first software asset and provide a first plurality of analytics and a first plurality of insights related to at least the first software asset;
   a correlation engine configured to:
      translate the first plurality of insights into a first set of universal data by converting the first plurality of insights into a common format, and
      correlate the first plurality of insights to predefined risks associated with at least the first software asset; and
   at least one graphical user interface configured to present one or more visualizations of at least one of: the first plurality of insights and the first plurality of analytics to at least on user.

2. The system of claim 1, wherein the first plurality of analytics contributes to an analytics history.

3. The system of claim 2, wherein the analytics engine is configured to aggregate the first plurality of analytics from the analytics history to develop risk maturity.

4. The system of claim 1, wherein the correlation engine is further configured to provide cross-tool data insights.

5. The system of claim 1, wherein the first plurality of insights are configured to provide information about high risk scenarios.

6. The system of claim 1, wherein the correlation engine is configured to provide a second plurality of analytics based on the predefined risks.

7. The system of claim 6, wherein the correlation engine is configured to provide a second plurality of insights based on the second plurality of analytics.

8. The system of claim 7, wherein the second plurality of insights is configured to provide information about high risk combinations.

9. The system of claim 1, wherein the correlation engine is configured to categorize the set of universal data according to at least a first product.

10. The system of claim 1, wherein the analytics engine is configured to operate recursively.

11. A method for visualizing and analyzing at least one software assets within an organization, wherein the method comprises:
    analyzing through an analytics engine a first software asset;
    providing a first plurality of analytics and a first plurality of insights related to the first software asset;
    translating through a correlation engine the first plurality of insights into a first set of universal data by converting the first plurality of insights into a common format; and
    correlating the first plurality of insights to predefined risks associated with the first software asset; and
    presenting, via at least one graphical user interface, one or more visualizations of at least one of: the first plurality of insights and the first plurality of analytics to at least one user.

12. The method of claim 11, wherein the first plurality of analytics contributes to an analytics history.

13. The method of claim 12, wherein the analytics engine is configured to aggregate the first plurality of analytics from the analytics history to develop risk maturity.

14. The method of claim 11, further comprising:
    analyzing through the analytics engine a second software asset;
    providing a second plurality of analytics and a second plurality of insights related to the second software asset;
    translating through the correlation engine the second plurality of insights into a second set of universal data; and
    correlating the second plurality of insights to predefined risks associated with the second software asset.

15. The method of claim 14, further comprising correlating the first set of universal data and the second set of universal data.

16. The method of claim 15, further comprising identifying high risk combinations between the first software asset and the second software asset, wherein identifying is based at least in part on correlating the first set of universal data and the second set of universal data.

17. The method of claim 15, further comprising developing cross-tool data insights based at least in part on correlating the first set of universal data and the second set of universal data.

18. The method of claim 11, further comprising:
    receiving a second plurality of analytics and a second plurality of insights related to a second software asset;
    translating through the correlation engine the second plurality of insights into a second set of universal data; and
    correlating the second plurality of insights to predefined risks associated with the second software asset.

* * * * *